US012702084B2

(12) United States Patent
Curd et al.

(10) Patent No.: US 12,702,084 B2
(45) Date of Patent: Aug. 11, 2026

(54) SYSTEM AND METHOD FOR DEFINING A WORK REGION BOUNDARY FOR USE BY AN AUTONOMOUS GROUNDS CARE VEHICLE

(71) Applicant: THE TORO COMPANY, Bloomington, MN (US)

(72) Inventors: Derek R. Curd, Longmont, CO (US); Jeremy J. Tate, Beatrice, NE (US); Justin L. Pryor, Beatrice, NE (US); William J. Krause, Boulder, CO (US); Weston M. Lewis, Lincoln, NE (US)

(73) Assignee: THE TORO COMPANY, Bloomington, MN (US)

( * ) Notice: Subject to any disclaimer, the term of this patent is extended or adjusted under 35 U.S.C. 154(b) by 76 days.

(21) Appl. No.: 18/729,401

(22) PCT Filed: Feb. 13, 2023

(86) PCT No.: PCT/US2023/012896
§ 371 (c)(1),
(2) Date: Jul. 16, 2024

(87) PCT Pub. No.: WO2023/158606
PCT Pub. Date: Aug. 24, 2023

(65) Prior Publication Data

US 2025/0098569 A1 Mar. 27, 2025

Related U.S. Application Data

(60) Provisional application No. 63/354,302, filed on Jun. 22, 2022, provisional application No. 63/337,675, (Continued)

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .......................... A01D 34/008; A01D 2101/00
(Continued)

(56) References Cited

U.S. PATENT DOCUMENTS 6,255,793 B1 7/2001 Peless et al.
6,677,938 B1 1/2004 Maynard
(Continued)

FOREIGN PATENT DOCUMENTS

EP 2390746 A2 11/2011
EP 3557359 A1 10/2019
(Continued)

OTHER PUBLICATIONS

Detecting Loop Closure with Scene Sequences, "Detecting Loop Closure with Scene Sequences | International Journal of Computer Vision | Springer Nâ¦"; (Year: 2007).*
(Continued)

*Primary Examiner* — Kenneth M Dunne
*Assistant Examiner* — Brian K Palmarchuk
(74) *Attorney, Agent, or Firm* — Mueting Raasch Group

(57) ABSTRACT

Systems and methods of defining a boundary of a work region are provided. The work region may be an area in which an autonomous vehicle (e.g., mower) may operate after boundary definition. The vehicle may initially be moved along a path around a work region, and geographic locations periodically recorded. Upon approaching an earlier geographic location, a controller associated with the vehicle may close the boundary (to form an enclosed area) upon sensing return or proximity to the earlier geographic location.

24 Claims, 16 Drawing Sheets

Related U.S. Application Data filed on May 3, 2022, provisional application No. 63/310,427, filed on Feb. 15, 2022.

(58) Field of Classification Search
USPC ............................................................ 701/23
See application file for complete search history.

(56) References Cited

U.S. PATENT DOCUMENTS

| | | | | |
|---|---|---|---|---|
| 7,085,624 | B2 * | 8/2006 | Aldred | G05D 1/0242 700/254 |
| 7,116,660 | B2 | 10/2006 | Sindhu et al. | |
| 8,019,475 | B2 | 9/2011 | Kuroda | |
| 8,428,776 | B2 | 4/2013 | Letsky | |
| 8,706,297 | B2 | 4/2014 | Letsky | |
| 9,497,901 | B2 | 11/2016 | Willgert | |
| 10,029,368 | B2 | 7/2018 | Wolowelsky et al. | |
| 10,338,602 | B2 | 7/2019 | Grufman et al. | |
| 10,405,488 | B2 | 9/2019 | Kamfors et al. | |
| 10,442,083 | B2 | 10/2019 | Wolowelsky et al. | |
| 10,485,164 | B2 | 11/2019 | Letsky | |
| 10,598,793 | B2 | 3/2020 | Öhrlund et al. | |
| 10,649,466 | B2 | 5/2020 | Holmström et al. | |
| 10,806,075 | B2 | 10/2020 | Grufman et al. | |
| 11,334,082 | B2 | 5/2022 | Frick et al. | |
| 11,351,670 | B2 | 6/2022 | Wolowelsky et al. | |
| 11,439,058 | B2 | 9/2022 | Letsky | |
| 11,835,343 | B1 * | 12/2023 | Ebrahimi Afrouzi | G05D 1/0272 |
| 2002/0156556 | A1 | 10/2002 | Ruffner | |
| 2003/0030398 | A1 | 2/2003 | Jacobs et al. | |
| 2007/0085373 | A1 | 4/2007 | Watanabe | |
| 2008/0027591 | A1 | 1/2008 | Lenser et al. | |
| 2008/0039974 | A1 | 2/2008 | Sandin et al. | |
| 2009/0002163 | A1 | 1/2009 | Farrington et al. | |
| 2009/0044370 | A1 | 2/2009 | Won et al. | |
| 2009/0054069 | A1 | 2/2009 | Calnan, III et al. | |
| 2009/0143912 | A1 | 6/2009 | Wang et al. | |
| 2009/0198375 | A1 | 8/2009 | Kanayama | |
| 2009/0282642 | A1 | 11/2009 | Batchelder et al. | |
| 2010/0082193 | A1 | 4/2010 | Chiappetta | |
| 2011/0153136 | A1 | 6/2011 | Anderson | |
| 2011/0184605 | A1 | 7/2011 | Neff | |
| 2013/0138246 | A1 | 5/2013 | Gutmann et al. | |
| 2014/0222197 | A1 | 8/2014 | Letsky | |
| 2016/0205341 | A1 | 7/2016 | Hollander et al. | |
| 2017/0225678 | A1 | 8/2017 | Bariant et al. | |
| 2017/0364090 | A1 * | 12/2017 | Grufman | G05D 1/0274 |
| 2018/0255704 | A1 * | 9/2018 | Kamfors | A01D 34/008 |
| 2020/0045880 | A1 | 2/2020 | Letsky | |
| 2020/0094825 | A1 * | 3/2020 | Kato | G06V 20/588 |
| 2020/0154632 | A1 * | 5/2020 | Chen | G05D 1/0221 |
| 2020/0267896 | A1 * | 8/2020 | Ingvalson | A01D 34/008 |
| 2022/0129006 | A1 * | 4/2022 | Vishnu | G01S 17/931 |
| 2022/0324112 | A1 | 10/2022 | Wolowelsky et al. | |
| 2023/0320274 | A1 * | 10/2023 | Vandike | G06V 20/56 701/50 |

FOREIGN PATENT DOCUMENTS

| | | | |
|---|---|---|---|
| EP | 3633410 | A1 | 4/2020 |
| JP | 2002-181560 | A | 6/2002 |
| WO | WO 01/20260 | A1 | 3/2001 |
| WO | WO 2014/027946 | A1 | 2/2014 |
| WO | WO 2015/072897 | A1 | 5/2015 |
| WO | WO 2021/110311 | A1 | 6/2021 |

OTHER PUBLICATIONS

Batavia et al., "Autonomous coverage operations in semi-structures outdoor environments" IEEE/RSJ International Conference on Intelligent Robots and Systems, Lausanne, Switzerland, Sep. 30-Oct. 4, 2002 available online at least as early as Sep. 30, 2002. Retrieved from the Internet on Aug. 23, 2023: <URL: https://ieeexplore.ieee.org/abstract/document/1041479>; 7 pgs.

International Search Report and Written Opinion for PCT/US2023/012896, dated May 25, 2023 (9 pages).

International Preliminary Report on Patentability for PCT/US2023/012896, dated Aug. 20, 2024 (6 pages).

* cited by examiner

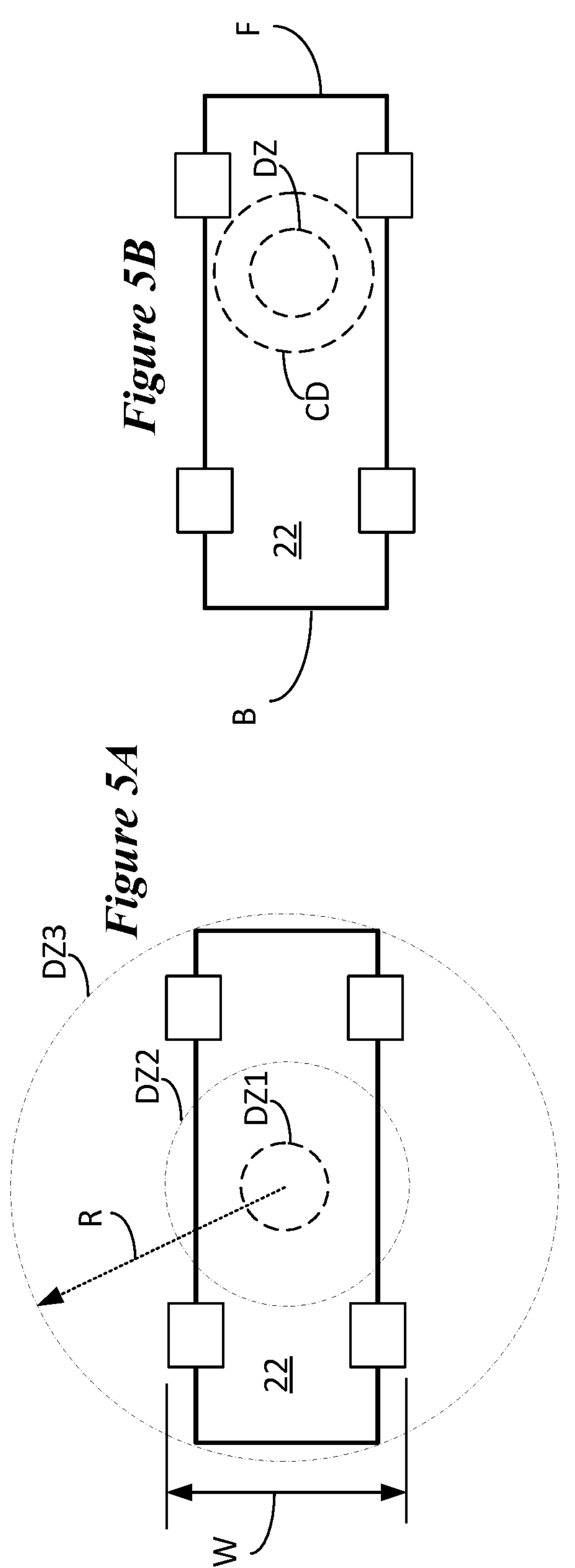
*Figure 5B*
*Figure 5A*
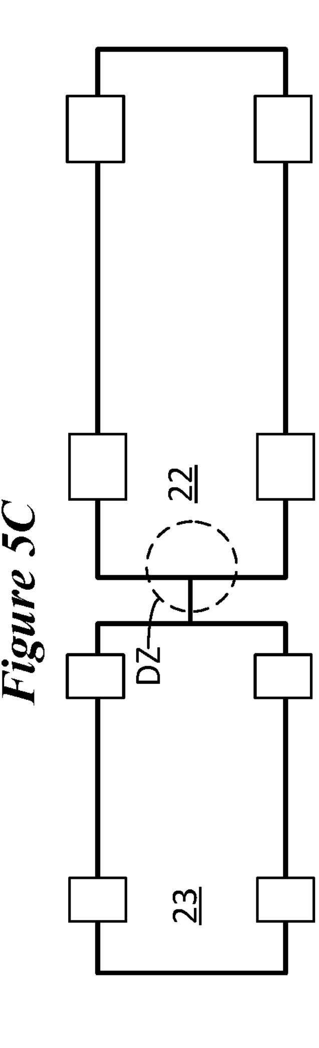
*Figure 5C*

SYSTEM AND METHOD FOR DEFINING A WORK REGION BOUNDARY FOR USE BY AN AUTONOMOUS GROUNDS CARE VEHICLE

The present application is the § 371 U.S. National Stage of International Application No. PCT/US2023/012896, filed 13 Feb. 2023, which claims priority to and/or the benefit of U.S. Provisional Patent Application Numbers: 63/354,302, filed 22 Jun. 2022; 63/337,675, filed 3 May 2022; and 63/310,427, filed 15 Feb. 2022, all of which are incorporated herein by reference in their respective entireties.

BACKGROUND

Various machines such as grounds care vehicles are used for performing a variety of tasks. For example, powered lawn mowers may be used by both homeowners and professionals alike to maintain grass areas within a property or yard. Some lawn mowers have the capability to autonomously perform grass cutting within a predefined boundary of a property.

SUMMARY

Embodiments described herein may provide a method of defining a boundary of a work region, comprising: moving a vehicle along a path around a work region, wherein a detection zone having a predetermined size is defined for the vehicle; recording a geographical location at each of a plurality of vehicle positions as the vehicle traverses the path; sensing exiting of recorded geographical locations from the detection zone of the vehicle in response to the detection zone passing beyond the recorded geographical locations; flagging recorded geographical locations that exit the detection zone as being eligible for closing a boundary of the work region; sensing return of the vehicle to an eligible geographical location in response to the eligible geographical location falling within the detection zone; and closing the boundary of the work region in response to sensing return of the vehicle to the eligible geographical location.

In another embodiment, a system for defining a boundary of a work region is provided that includes: a vehicle configured to traverse a path around a work region; a positioning sensor supported by the vehicle; and a controller supported by the vehicle and operably coupled to the positioning sensor. The controller is configured to: record a geographical location at each of a plurality of vehicle positions as the vehicle traverses the path, wherein a detection zone having a predetermined size is defined for the vehicle; sense exiting of recorded geographical locations from the detection zone of the vehicle in response to the detection zone passing beyond the recorded geographical locations; flag the recorded geographical locations that exit the detection zone as being eligible for boundary closure; sense return of the vehicle to an eligible geographical location in response to the eligible geographical location falling within the detection zone; and close a boundary of the work region in response to sensing return of the vehicle to the eligible geographical location.

In yet other embodiments, a method of defining a boundary of a work region is provided that includes: moving a vehicle along a path within a work region, wherein a detection zone having a predetermined size is defined for the vehicle; recording a geographical location at each of a plurality of vehicle positions as the vehicle traverses the path; sensing exiting of recorded geographical locations from the detection zone of the vehicle in response to the detection zone passing beyond the recorded geographical locations; flagging recorded geographical locations that exit the detection zone as being eligible for closing a boundary of the work region; detecting, within the detection zone, a particular geographical location and a point on a line segment defined between two or more eligible geographical locations; and closing the boundary of the work region in response to detecting the particular geographical location and the line segment point within the detection zone.

In still other embodiments, a method of defining a boundary of a work region is provided that includes: moving a vehicle along a path around a work region; recording a geographical location at each of a plurality of vehicle positions as the vehicle traverses the path; detecting crossing, by the vehicle, of a line segment defined between at least two geographical locations; recording a crossing location at which the line segment is crossed by the vehicle, the crossing location defining an origin and a terminus of the boundary of the work region; and closing the boundary of the work region in response to detecting crossing of the line segment by the vehicle, the boundary defined by the origin and additional geographical locations recorded as the vehicle traversed the path away from the origin and to the terminus.

In still yet other embodiments, a method of defining a boundary of a work region is provided that includes: moving a vehicle along a path around a work region; recording a geographical location at each of a plurality of vehicle positions as the vehicle traverses the path; detecting, with the vehicle, a point on a line segment defined between at least two of the geographical locations; and closing the boundary in response to detecting crossing of the line segment by the vehicle or detecting, within a detection zone of the vehicle, a particular geographical location in proximity to the line segment point, the boundary comprising an origin, a terminus defined by the line segment point or the particular geographical location, and additional geographical locations recorded as the vehicle traversed the path away from the origin and to the terminus.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 5A-5C illustrate diagrammatic top plan views of a vehicle having a detection zone of predetermined size and location in accordance with any of the embodiments disclosed herein, wherein: FIG. 5A shows a geometric center of the detection zone at or near a center of the vehicle; FIG. 5B shows the detection zone located forward of the center of the vehicle; and FIG. 5C illustrates the detection zone located between a midpoint of the vehicle and a midpoint of an implement towed or attached to the vehicle;

FIGS. 12A and 12B illustrate a boundary closure methodology in accordance with any of the embodiments disclosed herein, wherein: FIG. 12A diagrammatically shows a vehicle approaching boundary closure; and FIG. 12B show a closed boundary;

FIGS. 16A and 16B illustrate a boundary closure methodology in accordance with any of the embodiments disclosed herein, wherein: FIG. 16A illustrates a series of geographical locations recorded by a controller of the vehicle; and FIG. 16B illustrates the boundary after closure.

Figures 1A, 1B:
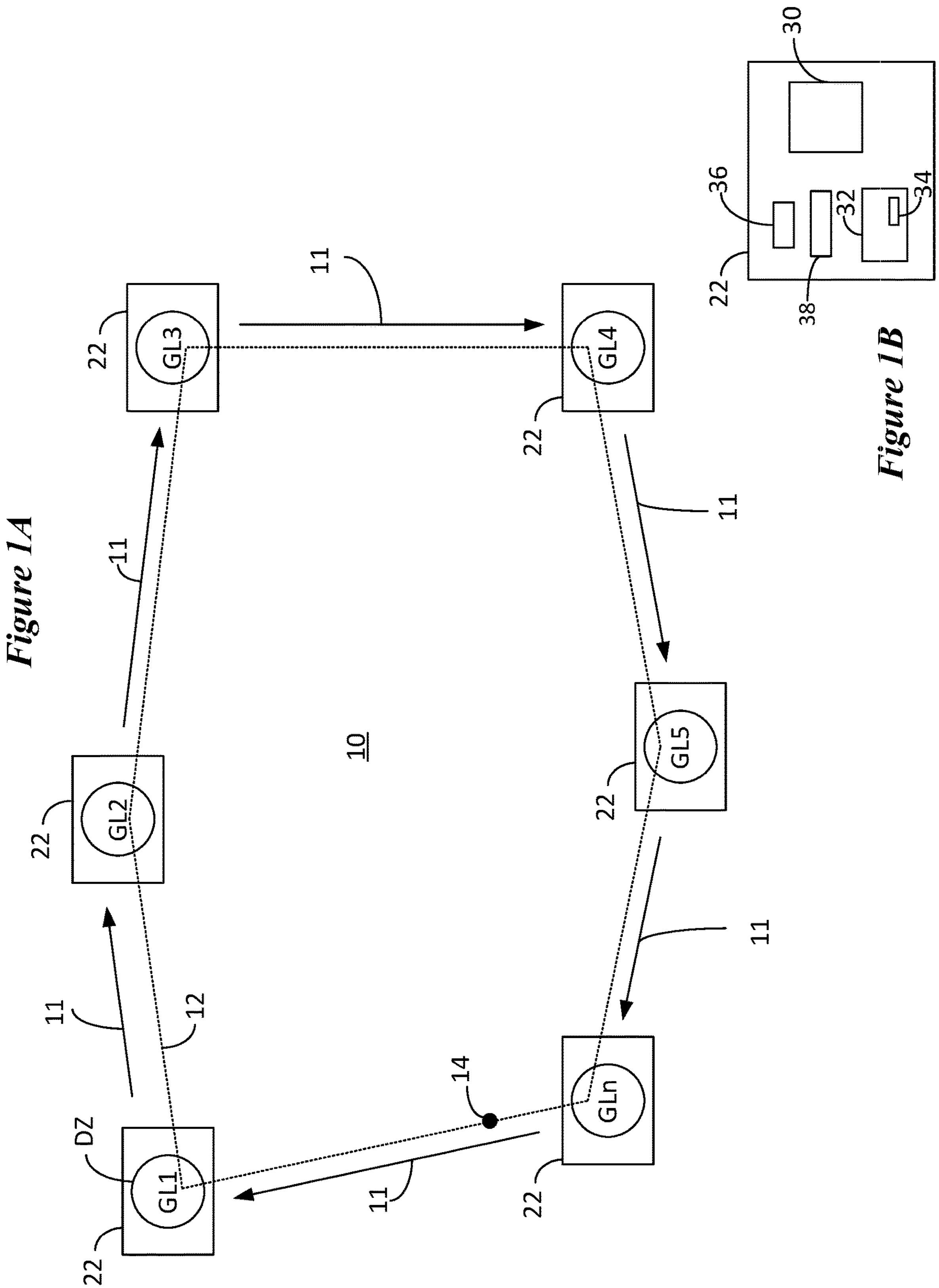
FIG. 1A illustrates a work region and a vehicle configured to implement a boundary closure methodology in accordance with any of the embodiments disclosed herein.
FIG. 1B illustrates various components of the vehicle shown in FIG. 1A and other figures in accordance with any of the embodiments disclosed herein.

The figures are rendered primarily for clarity and, as a result, are not necessarily drawn to scale. Like numbers used in the figures refer to like components. However, it will be understood that the use of a number to refer to a component in a given figure is not intended to limit the component in another figure labeled with the same number. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

Embodiments of the disclosure are directed to systems and methods for defining and closing a boundary of a work region using a vehicle. A boundary closure function can be initiated in response to an operator input provided via a user interface (which may be part of (integral to) the vehicle or may be a separate electronic device (e.g., a smartphone, tablet or other remote computer)) that is communicatively coupled to vehicle electronics (e.g., to a vehicle controller). In some embodiments, the vehicle is a grounds care vehicle having a grounds care implement operable in an autonomous mode. In other embodiments, the vehicle is a survey vehicle, and the boundary defined for a work region using the survey vehicle is subsequently transferred to a controller of a grounds care vehicle operable in an autonomous mode. According to various embodiments, the grounds care vehicle uses the boundary generated by the boundary closure function to perform work within the bounded work region in an autonomous mode.

In some embodiments, as the vehicle moves along a path around the work region during the boundary generation process, geographical locations are recorded using a positioning sensor supported by the vehicle and operably coupled to a controller associated and/or supported by the vehicle. As the vehicle moves past the recorded geographical locations relative to a detection zone of the vehicle, these recorded geographical locations are flagged by the controller as being eligible for boundary closure. In response to sensing return of the vehicle to a particular eligible geographical location, the boundary of the work region is closed by the controller either automatically or upon user action (manually). The boundary of the work region is defined by the particular eligible geographical location and other eligible geographic locations encountered by the vehicle while reaching the particular eligible geographical location. Embodiments of the disclosure significantly reduce the complexity of establishing a work region boundary for autonomous vehicles, for both homeowners and skilled grounds maintenance workers alike.

In other embodiments, as the vehicle moves along a path within the work region during the boundary generation process, geographical locations are recorded using a positioning sensor operably coupled to a controller of the vehicle. While moving along the path and recording geographical locations, the vehicle can be steered toward a section of the path previously traversed by the vehicle. Because geographical locations were previously recorded for this section of the path, the controller of the vehicle can be configured to detect crossing of a line segment defined by two or more geographical locations for this section of the path. The boundary of the work region may be automatically closed by the vehicle controller at the location at which the line segment is crossed by the vehicle. Alternatively, the controller may issue a notification to a user/operator to manually initiate boundary closure.

In some embodiments, a vehicle moves along a path around a work region, wherein a detection zone having a predetermined size is defined for the vehicle. A geographical location is recorded at each of a plurality of vehicle positions as the vehicle traverses the path around the work region. Exiting of recorded geographical locations from the detection zone is sensed in response to the detection zone passing beyond the recorded geographical locations. Recorded geographical locations that exit the detection zone are flagged as being eligible for closing a boundary of the work region. A particular geographical location and a point on a line segment defined between two or more eligible geographical locations are detected within the detection zone. The boundary of the work region is closed in response to detecting the particular geographical location and the line segment point within the detection zone.

FIG. 1A illustrates a work region 10 and a vehicle 22 configured to operate within the work region 10. The vehicle 22 represents a wide variety of vehicles, such as survey vehicles (e.g., ATVs, golf carts) and grounds care vehicles (e.g., lawn mowers, snow removal vehicles, grounds treatment vehicles, etc.). In various embodiments, the vehicle 22 represents a wide variety of vehicles that can operate in an autonomous mode. The vehicle 22 can incorporate or have attached thereto a grounds care implement including one or more of a cutting deck, an aerator (e.g., core aerator), a snow clearing implement, a fertilizing implement, and a weed management implement, for example.

FIG. 1B illustrates representative components of the vehicle 22, which include a propulsion system 30 (e.g., an electric motor, internal combustion engine) operably coupled to a controller 32. The controller 32 is operably coupled to a positioning sensor 36 supported by the vehicle 22, such as a camera-based vision system and/or a global positioning system (GPS) sensor, and includes a memory 34. The vehicle 22 can also include a user interface 38 operably coupled to the controller, such as a display (e.g., LED or LCD) for visual communication and, in some implementations, an audio output device (e.g., for verbal or other audible communications (e.g., notifications, and alerts)). Accordingly, the user interface may be configured to one or both of visually and audibly communicate status of defining the boundary. Additional components and functionality of a representative vehicle 22 (e.g., a mower) are described with reference to the illustrative embodiment shown in FIG. 17.

Figure 2:
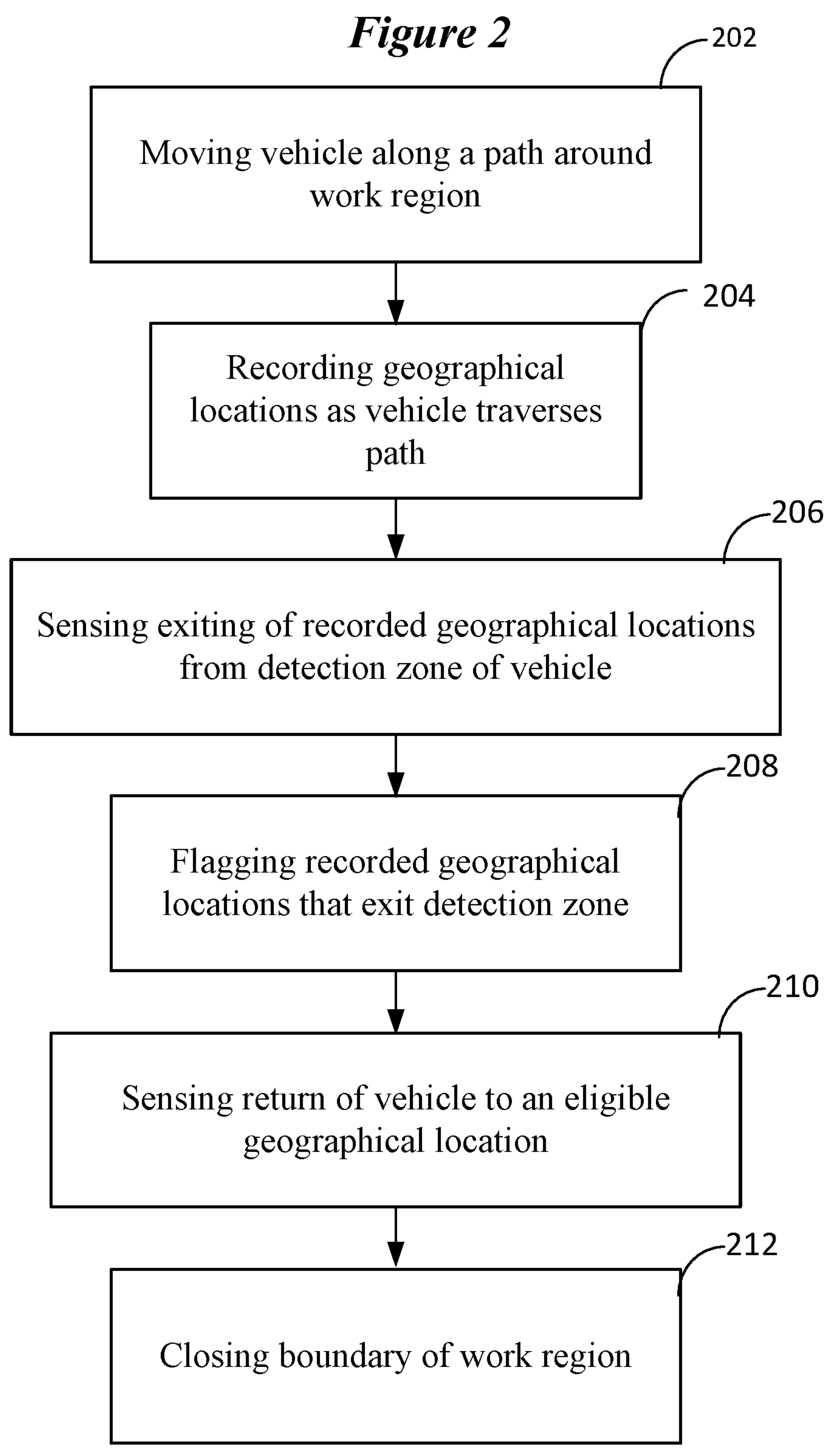
FIG. 2 illustrates a method by which a vehicle performs a boundary closure function in accordance with any of the embodiments disclosed herein.

The vehicle 22 is configured to implement a boundary closure function in accordance with any of the embodiments disclosed herein. FIG. 2 illustrates an exemplary method by which the vehicle 22 shown in FIGS. 1A and 1B performs a boundary closure function according to various embodiments. The method illustrated in FIG. 2 involves moving at 202 the vehicle 22 along a path 11 (shown by arrows) around the work region 10. A detection zone DZ having a predetermined size is defined for the vehicle 22. The detection zone DZ defines a region of, or about, the vehicle 22 that travels with the vehicle 22 and is used to detect movement of the vehicle 22 relative to geographical locations, GL1-GLn, recorded by the controller 32 in cooperation with the positioning sensor 36. The detection zone DZ can be defined as a region of specified size (e.g., a 3 foot region) defined about the current geographical location of a specified section of the vehicle (e.g., a central section of the vehicle). The current geographical location of the specified section of the vehicle can be determined using a transposition of the geographical location of the positioning sensor, such as by using a positional offset of the positioning sensor relative to the specified section of the vehicle 22.

The method of FIG. 2 involves recording at 204 a geographical location at each of a multiplicity of vehicle positions as the vehicle 22 traverses the path 11. For purposes of illustration and clarity of explanation, FIG. 1A shows six geographical locations, GL1-GL6 (where n=6), that have been recorded by the controller 32 and stored in the memory 34 as the vehicle 22 traversed the path 11. It is understood that the spacing between geographical locations can vary depending on the resolution of the positioning sensor 36 and/or desired spacing between geographical locations. The spacing between recorded geographical locations can range from several inches to several feet. For example, the vehicle 22 can record a geographical location, GL, every 2 or 3 inches or every 2 or 3 feet, for example, as the vehicle 22 traverses the path 11. A typical path will include dozens, hundreds or even thousands of recorded geographical locations. It is understood that the limited number of geographical locations shown in FIG. 1A and other figures is for purposes of clarity of explanation.

Figure 3:
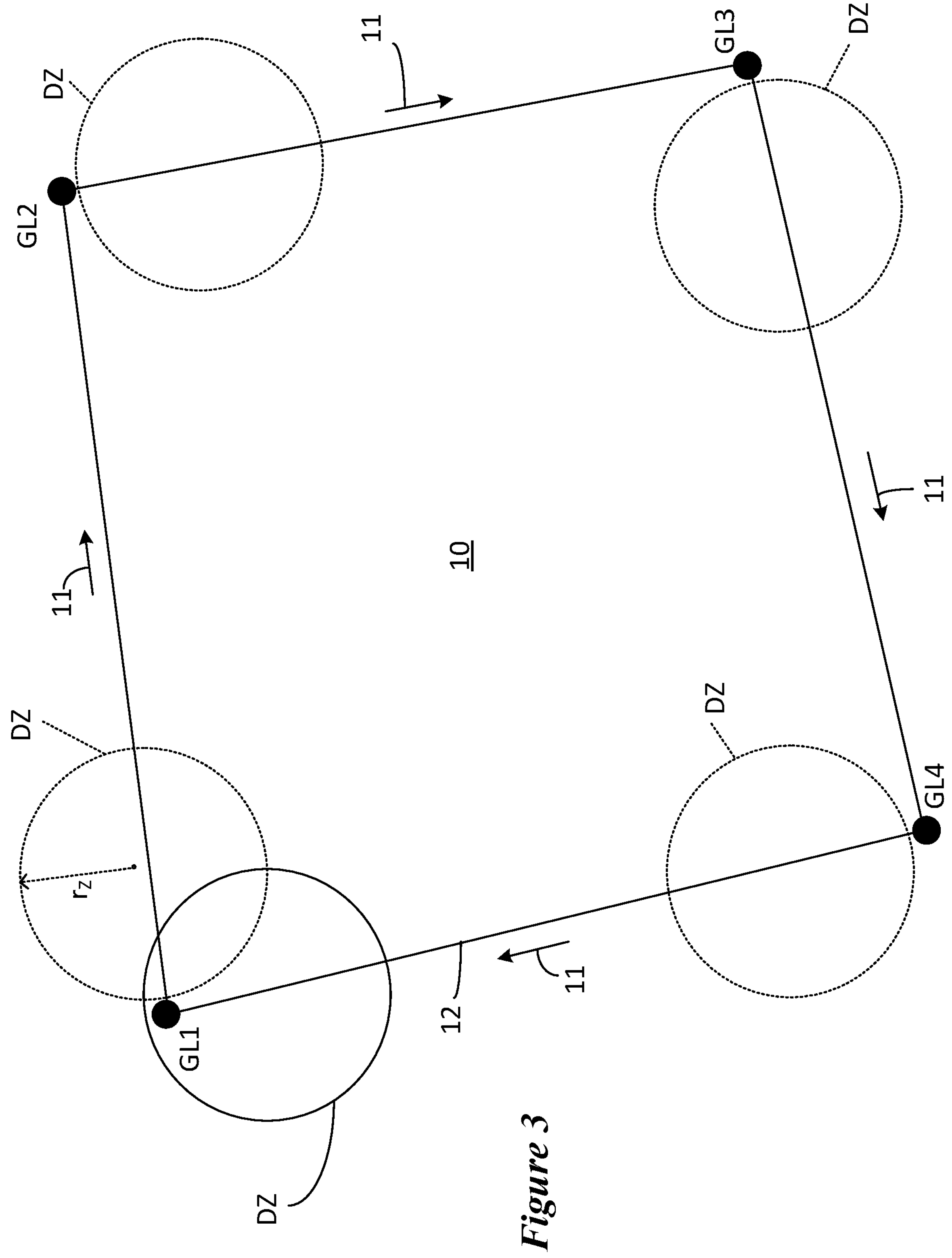
FIG. 3 illustrates a boundary closure methodology in accordance with any of the embodiments disclosed herein.

The method of FIG. 2 also involves sensing at 206 (e.g., by the controller 32) exiting of recorded geographical locations from the detection zone DZ of the vehicle 22 in response to the detection zone DZ passing beyond the recorded geographic locations (such exiting illustrated by locations of broken line detection zones DZ in FIG. 3). For example, assuming the detection zone DZ has a radius of 1 foot and the spacing between GL1 and GL2 is 3 feet, the controller 32 senses exiting of GL1 from the detection zone DZ when the vehicle 22 moves more than 1 foot away from GL1 towards GL2.

The method further involves flagging at 208 (e.g., by the controller 32) recorded geographical locations that exit the detection zone DZ as being eligible for closing a boundary of the work region. The flagged geographical locations are stored in the memory 34 of the controller 32. In the illustrative example shown in FIG. 1A, each of geographical locations GL1-GL6 has been flagged as being eligible for boundary closure by the time vehicle 22 has reached location 14 between geographical locations GL6 and GL1.

As is shown in FIG. 1A, vehicle 22 moves from location 14 towards geographical location GL1. The method of FIG. 2 involves sensing at 210 (e.g., by the controller 32) eligible geographical location GL1 in response to GL1 falling within the detection zone DZ. For example, assuming the detection zone DZ has a radius of 1 foot, the controller 32 senses return of the vehicle 22 to eligible geographical location GL1 (see solid line detection zone DZ in FIG. 3) in response to eligible geographic location GL1 falling within the 1 foot radius of DZ. The method of FIG. 2 further involves closing 212 the boundary 12 of the work region 10 in response to the controller 32 sensing return of the vehicle 22 to the eligible geographical location GL1. The boundary 12 of the work region 10 is defined by geographical location GL1 and additional geographical locations (GL2-GLn) recorded as vehicle 22 traversed the path 11 away from GL1 and then back to GL1.

In some cases, the boundary 12 established in the manner described herein may be undesirable. In such cases, the operator of the vehicle 22 can use the user interface 38 of the vehicle (which again could be a component of (e.g., integral to) the vehicle or could be a separate electronic device such as a smartphone) to delete the boundary 12. A new boundary 12 can be created by the operator in a manner described herein. In some implementations, the boundary closure location can be deleted by the operator (e.g., rather than the entire boundary 12), and a new boundary closure location can be selected in a manner described herein.

FIG. 3 illustrates a boundary closure methodology in accordance with any of the embodiments disclosed herein. It is understood that the limited number of geographical locations and spacing therebetween as shown in FIG. 3 is provided for clarity of explanation. In a typical operational implementation, there may be hundreds or even thousands of geographical locations recorded by the controller 32 as the vehicle 22 moves along a path 11 around a work region 10. It is also noted that the detection zone DZ (having a radius rz) is shown without reference to the vehicle in FIG. 3 (and FIG. 4) for clarity of explanation. Moreover, the detection zone DZ is shown as a circle in FIG. 3 (and FIG. 4) for illustrative purposes, but can be any shape.

It is assumed that the vehicle is moving around the work region 10 and that the operator issues a command to initiate defining of the boundary (e.g., initiates the boundary closure function via the user interface (e.g., a smartphone executing a boundary closure app)). In response to initiating the boundary closure function, the controller 32, in cooperation with the positioning sensor (see FIG. 1B), records geographical location GL1. As the vehicle moves away from geographical location GL1 and towards geographical location GL2, at some point the detection zone DZ moves past geographical location GL1. The controller 32 senses exiting of GL1 from the detection zone DZ and, in response, flags GL1 as being eligible for boundary closure.

In some implementations, the controller 32 can maintain a detection map in the memory 34 as the vehicle 22 (see FIG. 1B) moves along the path 11. The detection map can indicate the geographical locations recorded and flagged by the controller 32, the return geographical location that causes boundary closure, and the geographical locations that define the boundary 12. Representative detection maps are provided below. Detection Map A illustrates the state of boundary closure after the controller 32 senses exiting of GL1 from the detection zone DZ.

Detection Map A

| Recorded GLs | Flagged GLs | Return GL for Closure | Boundary GLs |
|---|---|---|---|
| 1 | 1 | — | — |
| — | — | — | — |
| — | — | — | — |
| — | — | — | — |

At some later point along the path 11, the controller records geographical location GL2. The vehicle 22 moves away from geographical location GL2 and at some point the detection zone DZ moves past GL2. In response, the controller 32 senses exiting of GL2 from the detection zone DZ and flags GL2 as being eligible for boundary closure. Detection Map B illustrates the state of boundary closure after the controller 32 senses exiting of GL2 from the detection zone DZ.

Detection Map B

| Recorded GLs | Flagged GLs | Return GL for Closure | Boundary GLs |
|---|---|---|---|
| 1 | 1 | — | — |
| 2 | 2 | — | — |
| — | — | — | — |
| — | — | — | — |

As the vehicle 22 continues along the path 11, the controller 32 records geographical location GL3, and, in response to sensing exiting of GL3 from the detection zone DZ, flags GL3 as being eligible for boundary closure. Detection Map C illustrates the state of boundary closure after the controller 32 senses exiting of GL3 from the detection zone DZ.

Detection Map C

| Recorded GLs | Flagged GLs | Return GL for Closure | Boundary GLs |
|---|---|---|---|
| 1 | 1 | — | — |
| 2 | 2 | — | — |
| 3 | 3 | — | — |
| — | — | — | — |

This process is repeated for additional recorded geographical locations as the vehicle 22 moves along the path 11. As is shown in FIG. 3, the controller 32 records geographical location GL4, senses exiting of GL4 from the detection zone DZ, and flags GL4 as being eligible for boundary closure. Detection Map D illustrates the state of boundary closure after the controller 32 senses exiting of GL4 from the detection zone DZ.

Detection Map D

| Recorded GLs | Flagged GLs | Return GL for Closure | Boundary GLs |
|---|---|---|---|
| 1 | 1 | — | — |
| 2 | 2 | — | — |
| 3 | 3 | — | — |
| 4 | 4 | — | — |

After exiting of GL4 from the detection zone DZ, the vehicle 22 heads in the direction of GL1, which was previously flagged as being eligible for boundary closure in the memory 34 of the controller 32 (see FIG. 1B). The controller 32 senses return of the vehicle 22 to GL1 in response to GL1 falling within the detection zone DZ. The controller 32 may automatically close the boundary 12 of the work region 10 in response to sensing return of the vehicle 22 to geographical location GL1 (alternatively, the user interface 38 (onboard the vehicle or via a smartphone or other remote computer) may provide a notification to the user indicating that manual user action (e.g., a button press) is needed to close the boundary). Detection Map E illustrates the state of boundary closure after the controller 32 senses return of the vehicle 22 to geographical location GL1.

Detection Map E

| Recorded GLs | Flagged GLs | Return GL for Closure | Boundary GLs |
|---|---|---|---|
| 1 | 1 | 1 | 1 |
| 2 | 2 | — | 2 |
| 3 | 3 | — | 3 |
| 4 | 4 | — | 4 |

The boundary 12 of the work region 10 is defined by the path 11 that originates at GL1, passes through GL2, GL3, and GL4, and terminates at GL1. According to some embodiments, after defining the boundary 12 of the work region 10 (e.g., the closed path which includes GLs 1-4), the controller is configured to autonomously work the work region 10 within the boundary 12 using a grounds care implement of the vehicle 22 (e.g., a grounds care vehicle). In the case of a survey vehicle 22, the boundary data collected by the survey vehicle 22 can be transferred to the controller/memory of a grounds care vehicle configured to autonomously work the work region 10 within the boundary 12 using a grounds care implement.

Figure 4:
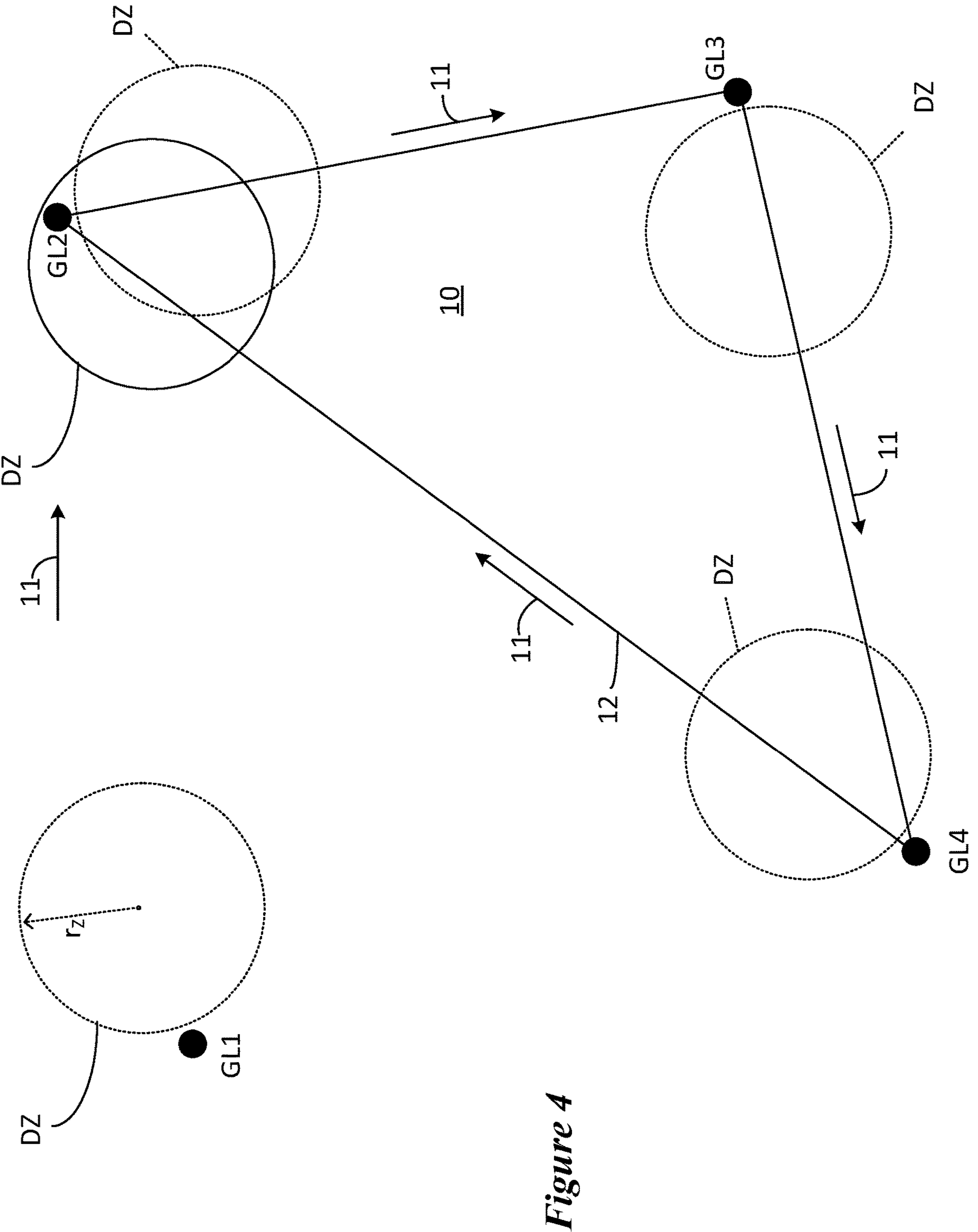
FIG. 4 illustrates a boundary closure methodology in accordance with any of the embodiments disclosed herein.

FIG. 4 illustrates a boundary closure methodology in accordance with any of the embodiments disclosed herein. It is assumed that the vehicle (not shown, but see associated detection zones DZ) is moving around the work region 10 and that the operator initiates the boundary closure function via the user interface. In response to initiating the boundary closure function, the controller 32, in cooperation with the positioning sensor, records geographical location GL1. As the vehicle moves away from geographical location GL1 and towards graphical location GL2 along path 11, at some point the detection zone DZ moves past geographical location GL1 as shown by the broken line rendering of the detection zone DZ proximate geographical location GL1. The controller 32 senses exiting of GL1 from the detection zone DZ and, in response, flags GL1 as being eligible for boundary closure. Detection Map F illustrates the state of boundary closure after the controller 32 senses exiting of GL1 from the detection zone DZ.

Detection Map F

| Recorded GLs | Flagged GLs | Return GL for Closure | Boundary GLs |
|---|---|---|---|
| 1 | 1 | — | — |
| — | — | — | — |
| — | — | — | — |
| — | — | — | — |

At some later point along the path 11, the controller records geographical location GL2. The vehicle 22 moves away from geographical location GL2 and, at some point the detection zone DZ moves past GL2 (see broken line detection zone DZ proximate geographical location GL2). In response, the controller 32 senses exiting of GL2 from the detection zone DZ and flags GL2 as being eligible for boundary closure. Detection Map G illustrates the state of boundary closure after the controller 32 senses exiting of GL2 from the detection zone DZ.

Detection Map G

| Recorded GLs | Flagged GLs | Return GL for Closure | Boundary GLs |
|---|---|---|---|
| 1 | 1 | — | — |
| 2 | 2 | — | — |
| — | — | — | — |
| — | — | — | — |

At some later point along the path 11, the controller records geographical location GL3. The vehicle 22 moves away from geographical location GL3 (see broken line detection zone DZ proximate geographical location GL3) and, at some point the detection zone DZ moves past GL3. In response, the controller 32 senses exiting of GL3 from the detection zone DZ and flags GL3 as being eligible for boundary closure. Detection Map H illustrates the state of boundary closure after the controller 32 senses exiting of GL3 from the detection zone DZ.

Detection Map H

| Recorded GLs | Flagged GLs | Return GL for Closure | Boundary GLs |
|---|---|---|---|
| 1 | 1 | — | — |
| 2 | 2 | — | — |
| 3 | 3 | — | — |
| — | — | — | — |

This process is repeated for additional recorded geographical locations as the vehicle 22 moves along the path 11. At some later point along the path 11, the controller records geographical location GL4. The vehicle 22 moves away from geographical location GL4 and, at some point the detection zone DZ moves past GL4 (see broken line detection zone DZ proximate geographical location GL4). In response, the controller 32 senses exiting of GL4 from the detection zone DZ and flags GL4 as being eligible for boundary closure. Detection Map I illustrates the state of boundary closure after the controller 32 senses exiting of GL4 from the detection zone DZ.

Detection Map I

| Recorded GLs | Flagged GLs | Return GL for Closure | Boundary GLs |
|---|---|---|---|
| 1 | 1 | — | — |
| 2 | 2 | — | — |
| 3 | 3 | — | — |
| 4 | 4 | — | — |

Upon leaving geographical location GL4, the vehicle 22 moves in a direction toward GL2 (rather than GL1 as in the case shown in FIG. 3). As is shown in FIG. 4, the controller 32 senses return of the vehicle 22 to GL2 in response to GL2 again falling within the detection zone DZ (see solid line detection zone DZ proximate geographical location GL2). Detection Map J illustrates the state of boundary closure after the controller 32 senses return of the vehicle 22 to GL2.

Detection Map J

| Recorded GLs | Flagged GLs | Return GL for Closure | Boundary GLs |
|---|---|---|---|
| 1 | 1 | — | — |
| 2 | 2 | 2 | 2 |
| 3 | 3 | — | 3 |
| 4 | 4 | — | 4 |

The controller 32 may automatically (or manually upon notification via the user interface and corresponding user response) close the boundary 12 of the work region 10 in response to sensing return of the vehicle 22 to graphical location GL2. The boundary 12 of the work region 10 is defined by the path 11 that originates at GL2, passes through geographical locations GL3 and GL4, and terminates at GL2. In this illustrative example, geographical location GL1 is excluded from the boundary 12, notwithstanding that GL1 is a geographical location eligible for boundary closure. FIG. 4 illustrates that any of the eligible geographical locations along the path 11 is a candidate for closing the boundary 12 of the work region 10. Thus, the boundary 12 may be considered to be defined by an eligible geographical location and additional geographical locations that were recorded as the vehicle traversed the path away from the eligible geographical location and back to the eligible geographical location.

Figure 17:
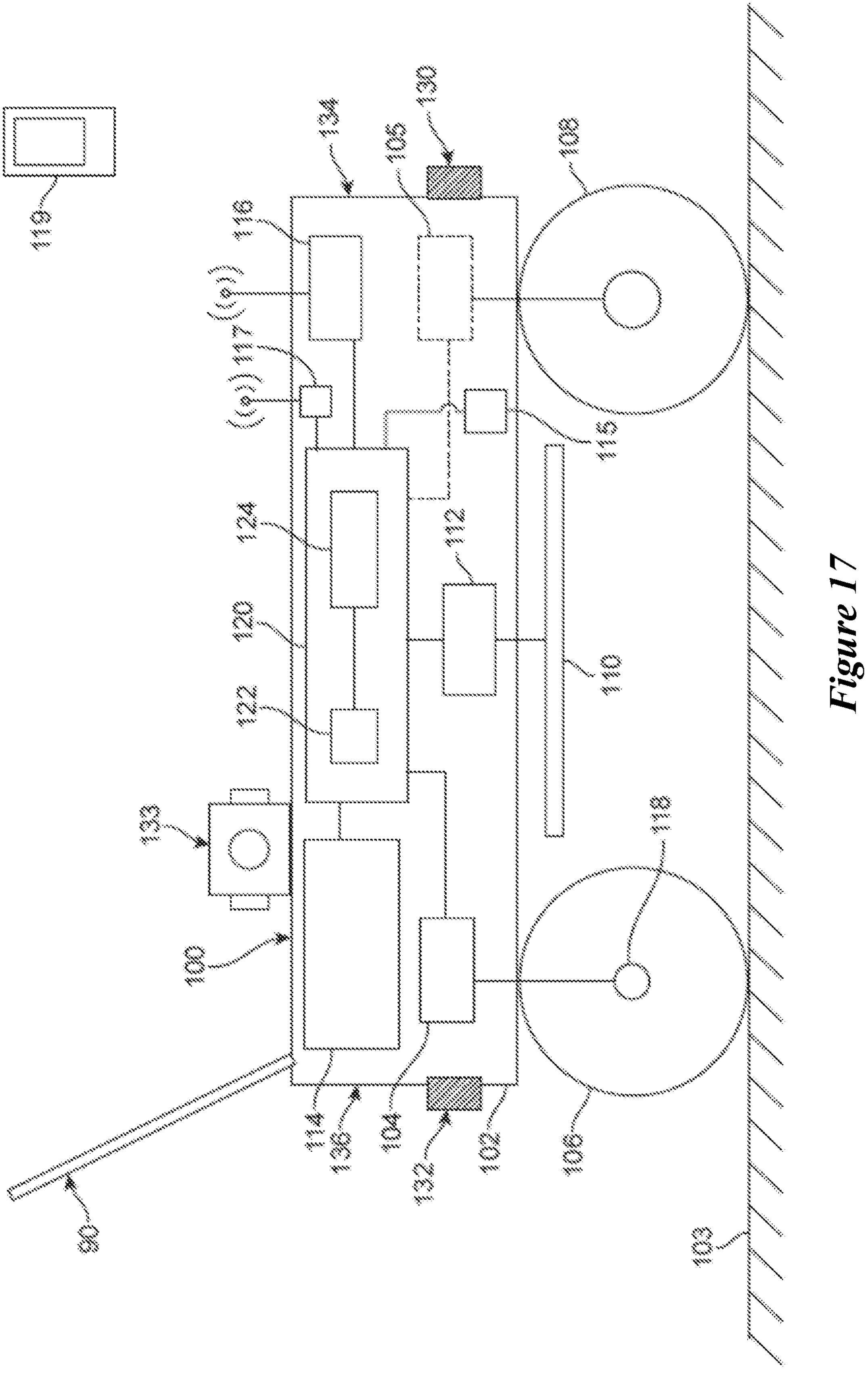
FIG. 17 illustrates a representative vehicle configured to implement a boundary closure methodology in accordance with any of the embodiments disclosed herein.

As indicated above, in the embodiments described in FIGS. 3 and 4 as well as the other embodiments described herein, boundary closure may be either automatic or manual. That is to say, closing the boundary may include automatically closing the boundary in response to sensing return of the vehicle (e.g., detection zone DZ) to the eligible geographical location. Alternatively, closure of the boundary may require some sort of manual user input. For example, closing the boundary may include issuing a notification via the user interface 38 (which again may be integrated with the vehicle or be a separate portable electronic device (e.g., device 119 such a smartphone as shown in FIG. 17)) in response to sensing return of the vehicle to the eligible geographical location. The notification may (e.g., audibly and/or visually) request user action to manually close the boundary (e.g., press a button associated with the user interface).

The location and size of the detection zone DZ can vary depending on a number of factors including, for example, the type of vehicle, the type of grounds care implement transported by the vehicle, the resolution of the positioning sensor, the size of the geographical locations recorded by the controller as the vehicle traverses the path 11, and the spacing between adjacent geographical locations. FIG. 5A illustrates a vehicle 22 in which a geometric center of the detection zone DZ is located at approximately a center (e.g., mid-point) of the vehicle 22. While the sensor(s) that ultimately create the detection zone DZ may define a three-dimensional detection space (e.g., each sensor may define a spherical detection zone), the detection zone DZ may be understood herein as being a two-dimensional area projected onto a plane containing (or parallel to) the ground surface. In FIG. 5A, the detection zone DZ1 has a circular shape and a size (e.g., radius) which is smaller than a width W of the vehicle 22. For example, the radius of the detection zone DZ1 shown in FIG. 5A can range from about 1 to 4 feet. Although shown as a circle in FIG. 5A, it is understood that the detection zone DZ1 (as well as any other detection zones described herein) can have any shape, such as a polygonal shape, a curvilinear shape, a mixed polygonal and curvilinear shape, or an arbitrary shape.

In other embodiments, the detection zone may correspond (e.g., have a diameter similar) to a width W of the vehicle 22 as represented by detection zone DZ2 in FIG. 5A. In still other embodiments, the detection zone may correspond to a radius of the vehicle 22 as shown by detection zone DZ3 in FIG. 5A. The "radius" of the vehicle may be defined as a virtual circle having a radius R, wherein the circle is positioned to circumscribe the entire vehicle when viewed from above as shown in FIG. 5A.

FIG. 5B illustrates a vehicle 22 in which the detection zone DZ is located or biased forward of the center or mid-point of the vehicle 22. For example, the vehicle 22 can include a cutting deck CD having a location that is biased towards a front end F (as opposed to a back end B) of the vehicle 22. The detection zone DZ can be located proximate the cutting deck CD (e.g., biased forward of the mid-point the vehicle towards the front end). FIG. 5C illustrates a vehicle 22 configured to tow a work or grounds care implement 23 (e.g., a cart, a fertilizing unit). In this illustrative embodiment, the detection zone DZ can be positioned between a mid-point (e.g., along a longitudinal axis) of the vehicle 22 and a mid-point (e.g., along a longitudinal axis) of the work or grounds care implement 23 (e.g., encompassing all or a portion of a hitch).

Figure 6:
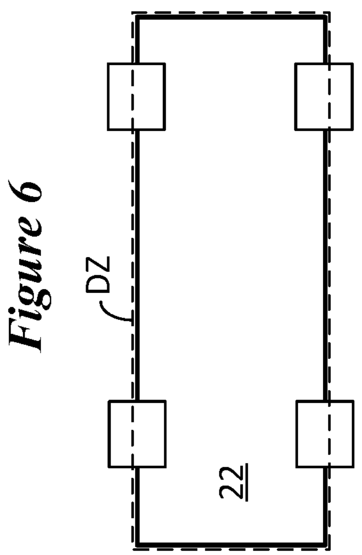
FIG. 6 illustrates another diagrammatic top plan view of a vehicle having a detection zone of predetermined size in accordance with any of the embodiments disclosed herein.
Figure 7:
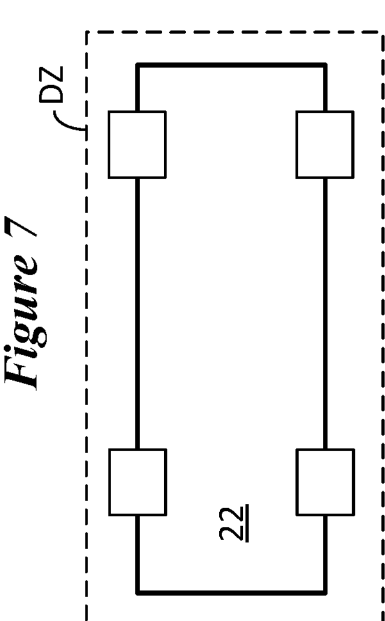
FIG. 7 illustrates yet another diagrammatic top plan view of a vehicle having a detection zone of predetermined size in accordance with any of the embodiments disclosed herein.

FIG. 6 illustrates a vehicle 22 in which the detection zone DZ has a rectangular shape and a size (e.g., width and length) which is approximately equal to that of the vehicle 22. For example, the detection zone DZ shown in FIG. 6 can have a width that can range from about 3 to 6 feet and a length that can range from about 5 to 7 feet. FIG. 7 illustrates a vehicle 22 in which the detection zone DZ has a rectangular shape at a size which is greater than that of the vehicle 22. For example, the detection zone DZ shown in FIG. 7 can have a width of about 3-6 feet and a length of about 5-8 feet.

Accordingly, the predetermined size of the detection zone DZ may be: smaller than the size of the vehicle; about the size of the vehicle; or larger than the size of the vehicle. Moreover, while described as static, the size of the detection zone may, in some embodiments, be dynamically adjusted to accommodate for example, changes in vehicle speed.

Figure 8:
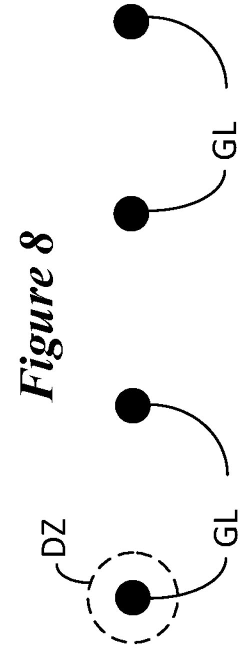
FIG. 8 illustrates the size and shape of a detection zone relative to the spacing between adjacent geographical locations recorded by a controller of a vehicle in accordance with any of the embodiments disclosed herein.
Figure 9:
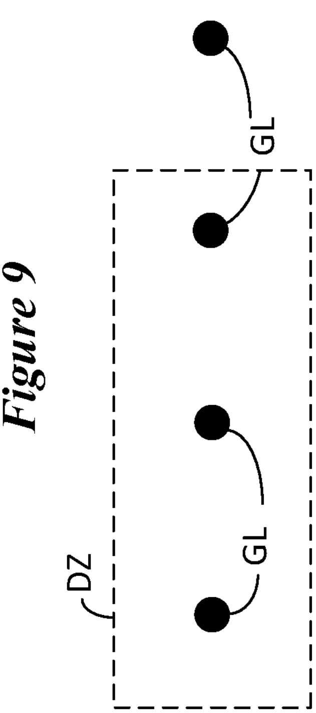
FIG. 9 illustrates the size and shape of a detection zone relative to the spacing between adjacent geographical locations recorded by a controller of a vehicle in accordance with any of the embodiments disclosed herein.

FIG. 8 illustrates the size of a detection zone DZ relative to the spacing between adjacent geographical locations, GLs. In FIG. 8, the detection zone DZ is sized to accommodate a single geographical location, GL. In FIG. 9, the detection zone DZ is sized to accommodate a multiplicity of geographical locations, GLs. In the case of the detection zone DZ shown in FIG. 9, and assuming that each of the geographical locations is eligible for boundary closure as previously described, boundary closure may be based on the first geographic location which is encountered by, and falls within, the detection zone DZ.

Figure 10:
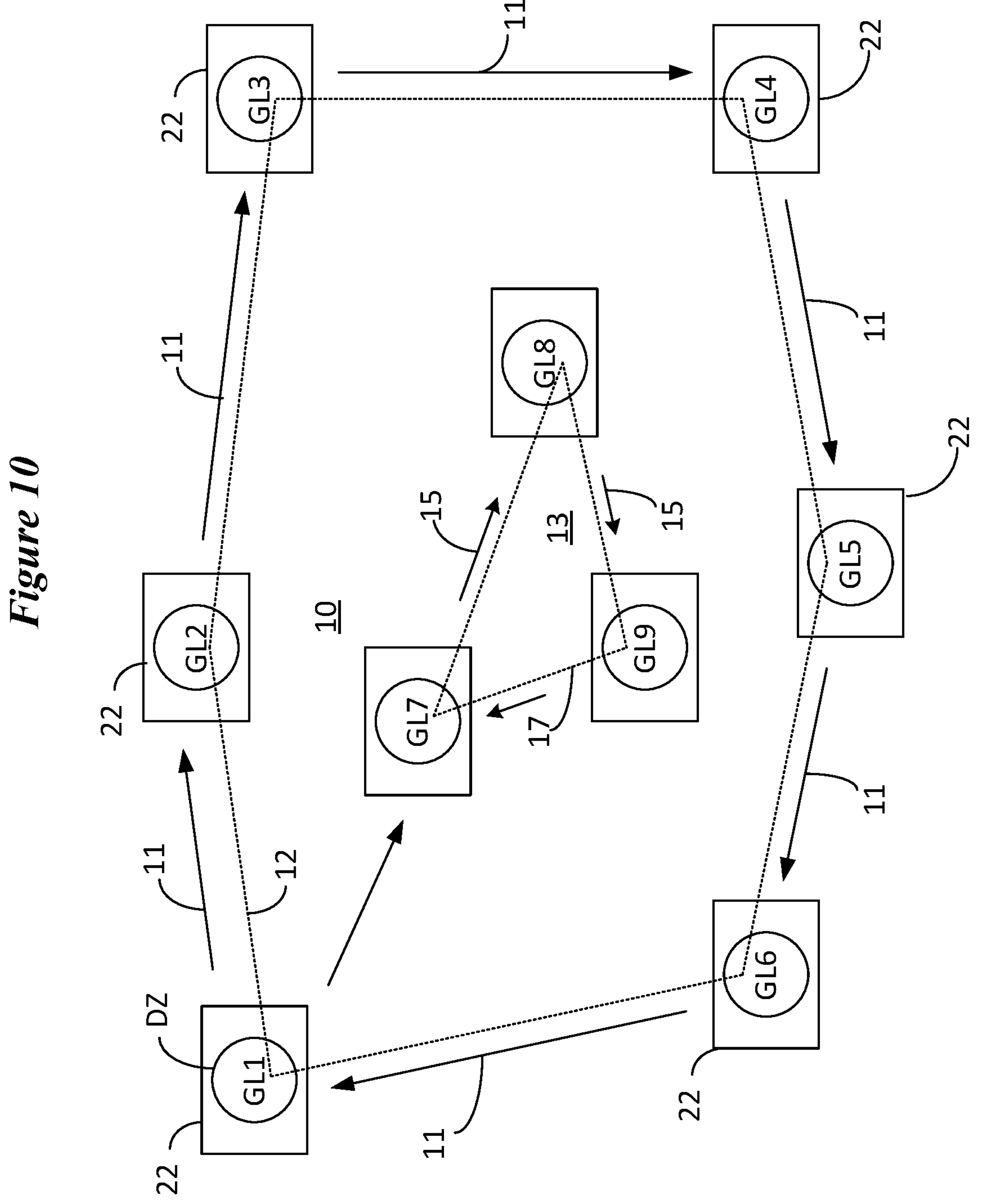
FIG. 10 illustrates a method of implementing boundary closure of a work region and an exclusion zone within the work region in accordance with any of the embodiments disclosed herein.

FIG. 10 illustrates a method of implementing boundary closure of a work region 10 and an exclusion zone 13 within the work region 10 in accordance with any of the embodiments disclosed herein. The exclusion zone 13 is a region within the work region 10 in which the vehicle 22 is excluded from entering or traversing. For example, the exclusion zone 13 can be a raised garden situated within a backyard lawn.

FIG. 10 shows boundary 12 of the work region 10 established using the methodologies previously described (e.g., defined by moving the vehicle 22 along the path 11). In FIG. 10, boundary closure is effected when the vehicle 22 moves away from geographical location GL6 and returns to geographical location GL1 (e.g., after recording GL2-GL5) in a manner previously described.

As is further shown in FIG. 10, the vehicle 22 may move into the interior of the boundary 12 and traverse a path 15, generally repeating the method used to define the boundary of the work region. That is, the controller 32 of the vehicle 22 may record geographical locations GL7, GL8, and GL9, sense exiting of recorded geographical locations GL7, GL8, and GL9 from the detection zone DZ, and flag these geographical locations as being eligible for boundary closure in a manner previously described. The controller 32 senses return of the vehicle 22 to geographical location GL7 and, in response, may automatically close the boundary 17 of the exclusion zone 13 (or, as stated above, issue a notification to the user/operator that manual closure may be initiated).

Based on the geographical coordinates of the exclusion zone 13 relative to those of the bounded work region 10, the controller 32 automatically determines that the exclusion zone 13 falls within the boundary 12 of the work region and, therefore, is flagged as an exclusion zone. A grounds care vehicle that uses the boundary data collected by vehicle 22 (which can be vehicle 22 in various embodiments) can perform work within the work region 10 while avoiding the exclusion zone 13.

Figure 11:
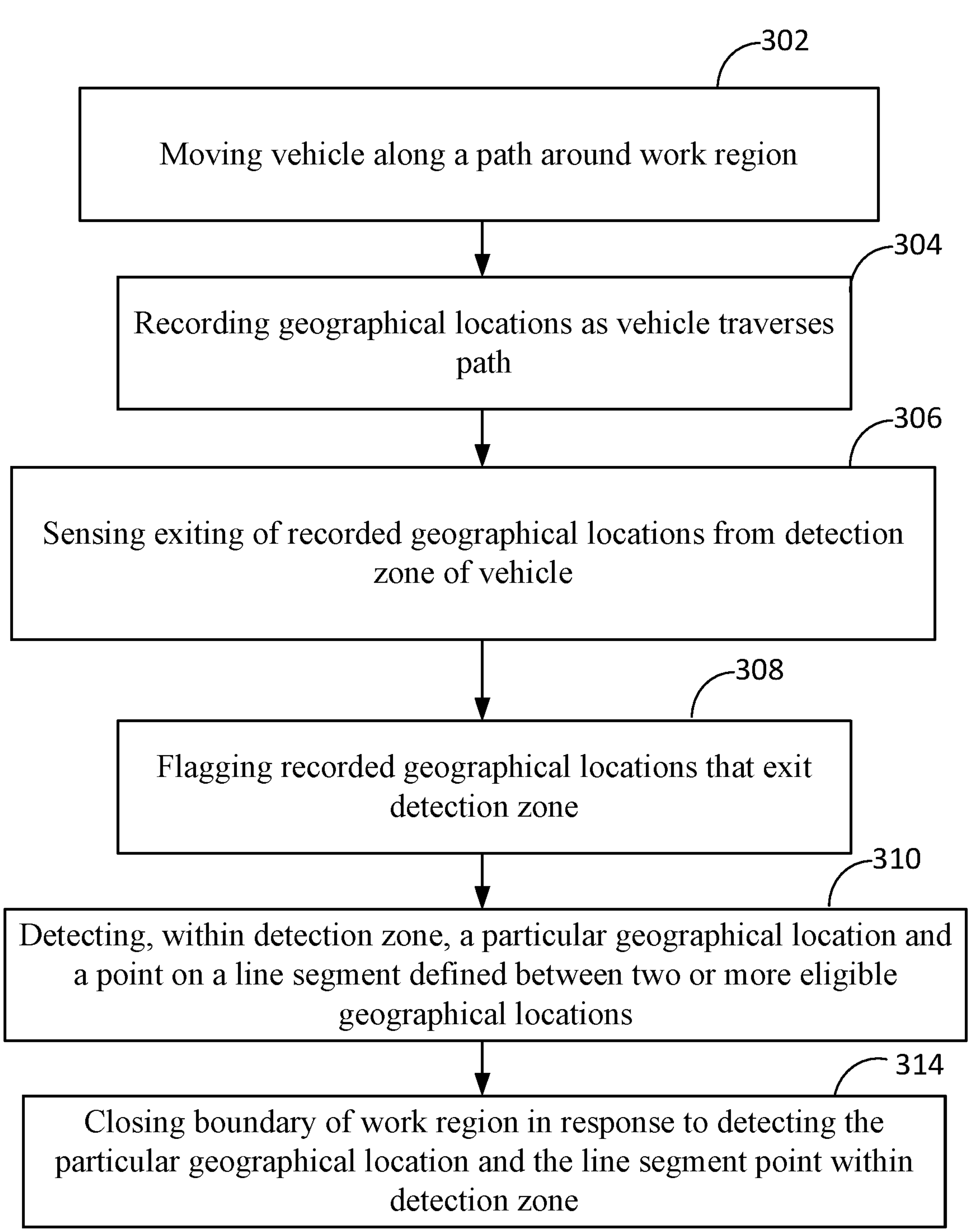
FIG. 11 illustrates a method by which a vehicle performs a boundary closure function in accordance with any of the embodiments disclosed herein.
Figure 12A:
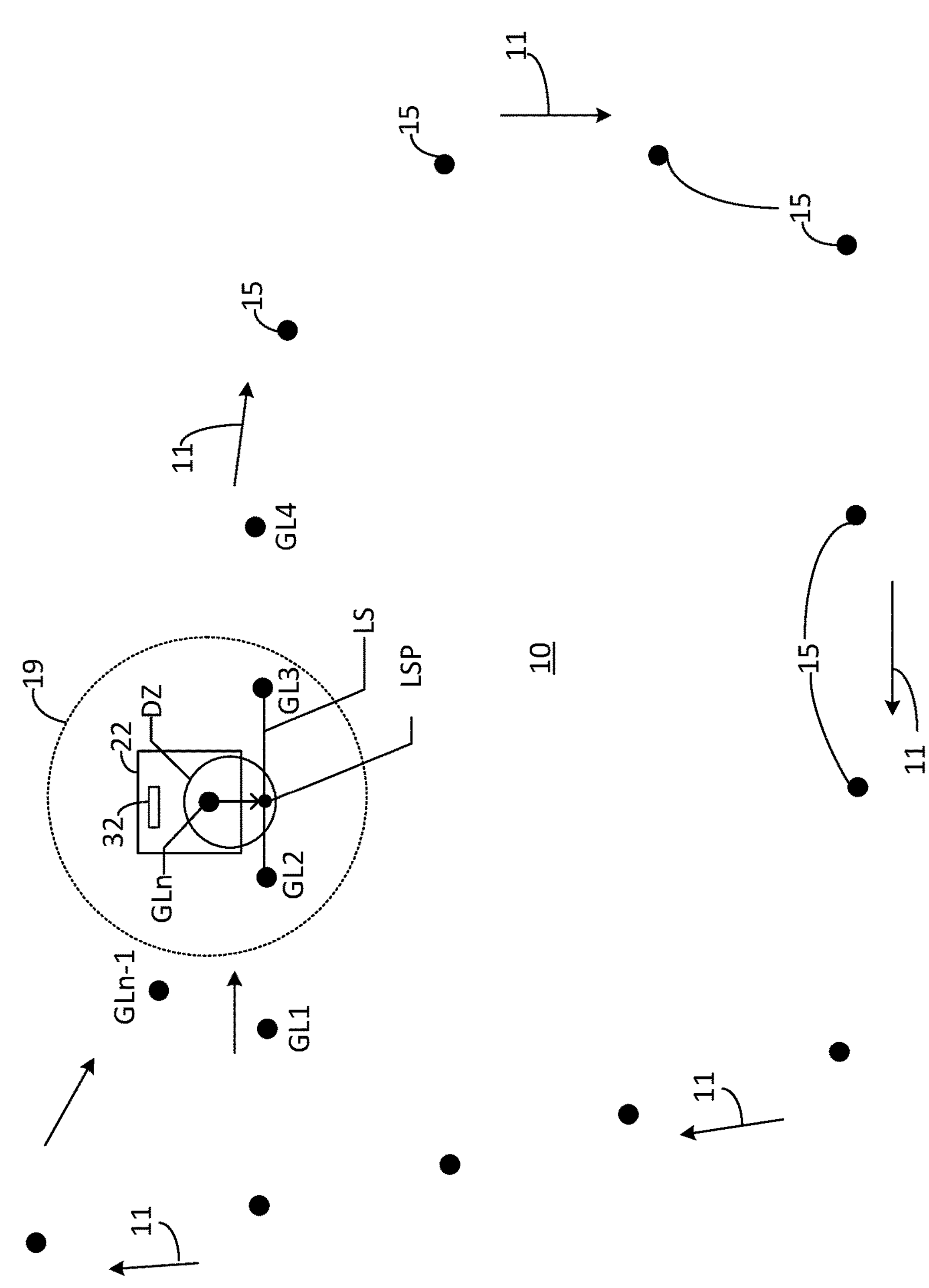
Figure 12B:
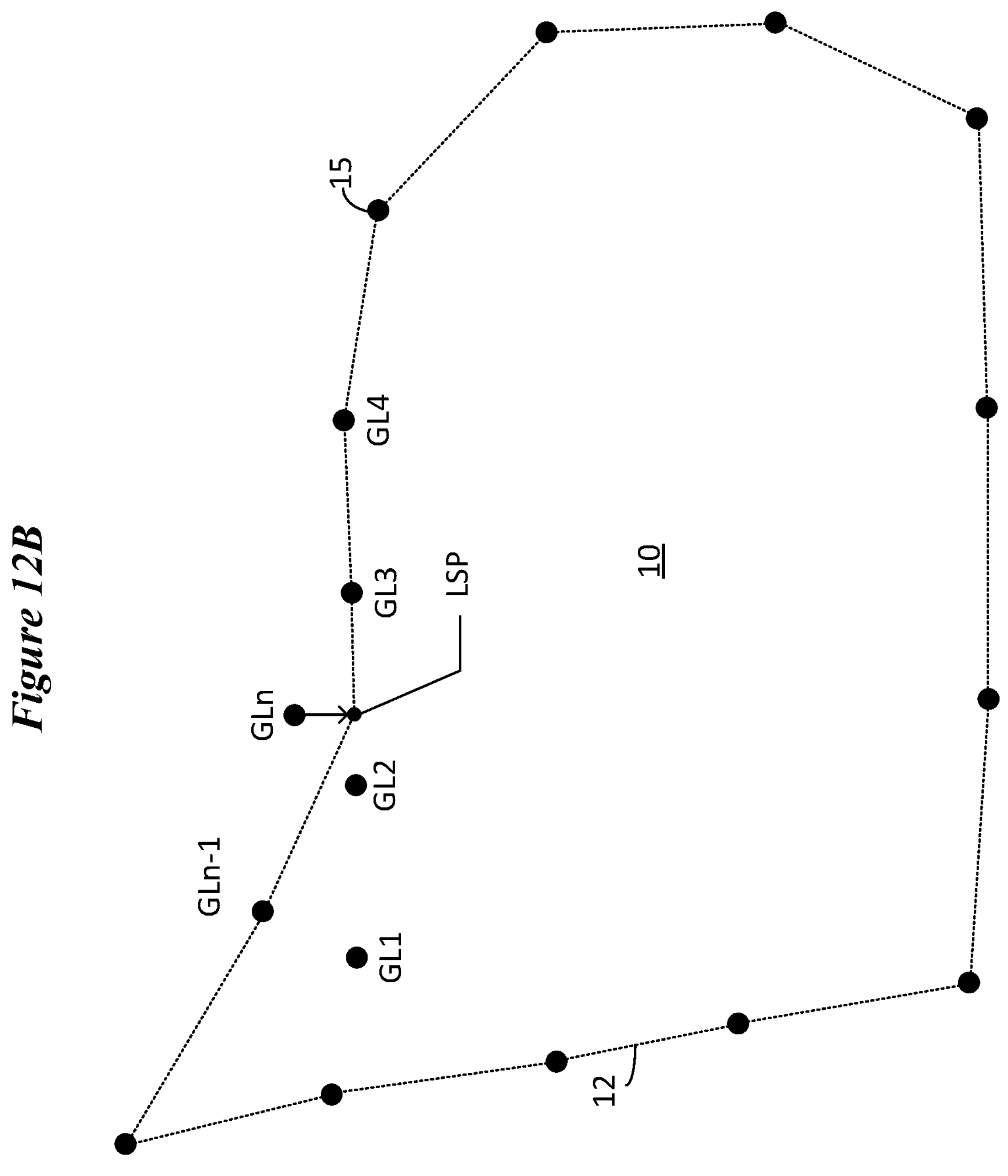

FIGS. 11, 12A, and 12B illustrate a boundary closure methodology in accordance with any of the embodiments disclosed herein. It is understood that the limited number of geographical locations and spacing therebetween as shown in FIGS. 12A and 12B is provided for clarity of explanation. In a typical operational implementation, there may be hundreds or thousands of geographical locations recorded by the controller 32 as the vehicle 22 moves along a path 11 around a work region 10. Although shown as being generally equidistant, the spacing between geographical locations 15 can be variable. For example, each of the geographical locations 15 can correspond to a sampling of the positioning sensor 36, with spacing between geographical locations 15 being dependent on the speed and direction of the vehicle 22 while sampling the positioning sensor 36 (see FIG. 1B). It is assumed that the vehicle 22 is moved around the work region 10 and that the operator initiates the boundary closure function via the user interface 38 (e.g., onboard or via a smartphone executing a boundary closure app).

The method illustrated in FIG. 11 involves moving at 302 the vehicle 22 along a path 11 (shown by arrows in FIG. 12A starting at geographical location GL1) around the work region 10. As previously described, a detection zone DZ having a predetermined size is defined for the vehicle 22. The method of FIG. 11 involves recording at 304 a geographical location 15 at each of a multiplicity of vehicle positions as the vehicle 22 traverses the path 11. The method of FIG. 11 also involves sensing at 306 (e.g., by the controller 32) exiting of recorded geographical locations from the detection zone DZ of the vehicle 22 in response to the detection zone DZ passing beyond the recorded geographic locations 15. The method further involves flagging at 308 (e.g., by the controller 32) geographical locations 15 that exit the detection zone DZ as being eligible for closing the boundary of the work region. The flagged geographical locations 15 are stored in the memory 34 of the controller 32. In the illustrative example shown in FIG. 12A, each of geographical locations GL1-GLn-1 has been flagged as being eligible for boundary closure by the time vehicle 22 has reached geographical location GLn.

As is shown in FIG. 12A, vehicle 22 moves from geographical location GLn-1 in a direction generally towards geographical location GL3 and records geographical location GLn. The method of FIG. 11 involves detecting at 310, within the detection zone DZ, a particular geographical location (e.g., GLn) and a point on a line segment (LSP) defined between two or more eligible geographical locations (e.g., GL2 and GL3). As is shown in FIG. 12B, the line segment point LSP, or a location between the line segment point LSP and the geographical location GLn, can define an origin and a terminus of the boundary 12 of the work region 10. The method of FIG. 11 also involves closing at 314 the boundary 12 of the work region 10 in response to detecting the particular geographical location (GLn) and the line segment point LSP within the detection zone DZ. A status message indicating boundary closure can be communicated to the operator of the vehicle 22 via the user interface 38. In this illustrative example, the boundary 12 can be defined by the origin and additional geographical locations recorded as the vehicle traversed the path away from the origin and back to the terminus.

The methodology depicted in FIGS. 11, 12A, and 12B provides for boundary closure in scenarios where one or more geographical locations are in close proximity to the vehicle's detection zone DZ but are just beyond (e.g., outside of) the detection zone DZ. This methodology infers the operator's intent to close the boundary at a particular geographical location when the particular geographical location and a point on a line segment (line segment point or LSP) between two neighboring geographical locations fall within the detection zone DZ of the vehicle 22.

As previously described, the boundary 12 established in the manner described herein may be undesirable. In such cases, the operator of the vehicle 22 can use the user interface 38 (e.g., on the vehicle or associated with a smartphone) to delete the boundary 12. A new boundary 12 can be created by the operator in a manner described herein. In some implementations, the boundary closure location (e.g., line segment point LSP) can be deleted by the operator (e.g., rather than the entire boundary 12), and a new boundary closure location can be established in a manner described herein.

In the illustration shown in FIG. 12A, the vehicle 22, after recording geographical location GLn-1, has a heading directed towards a section of the path 11 comprising previously recorded geographical locations GL2 and GL3. As is shown in FIG. 12A, the detection zone DZ of vehicle 22 crosses a line segment LS defined between geographical locations GL2 and GL3. A point LSP on the line segment LS is defined by the controller 32 as an intersecting location. The controller 32 is configured to extrapolate the line segment LS using an extrapolation algorithm (e.g., regression, polynomial curve fitting) to define the line segment LS between geographical locations GL2 and GL3. Although FIG. 12A shows the line segment LS defined between two geographical locations, it is understood that more than two geographical locations (e.g., 3, 4, or 5 geographical locations) can be used to define the line segment LS. Also, the vehicle 22 need not cross the line segment LS. For example, the detection zone DZ can be larger than the vehicle 22 or be defined as a zone ahead of the vehicle 22, as previously described.

In illustrative example shown in FIGS. 12A and 12B, the boundary 12 is defined by the line segment point LSP and additional geographical locations 15 recorded as the vehicle 22 traversed the path away from the line segment point LSP and back to the line segment point LSP. In other words, the line segment point LSP can define the origin and the terminus of the boundary 12. In the illustrative example shown in FIGS. 12A and 12B, the boundary closure procedure effectively trims geographical location GLn and a portion of the path 11 originating from GL1 and terminating at the line segment point LSP from the boundary 12 (see FIG. 12B).

According to some embodiments, the controller 32 is configured to extrapolate the line segment LS using two or more geographical locations that are in proximity to the vehicle 22. For example, the controller 32 can be configured to detect two or more geographical locations that are proximate a current location of the vehicle 22. The controller 32 can compare the current location of the vehicle 22 with previously stored geographical locations near the vehicle 22 to determine candidate geographical locations for extrapolating the line segment LS.

In some embodiments, the controller 32 can detect previously stored geographical locations that are within a sensing distance 19 (e.g., a sensing radius) of the vehicle 22. The sensing distance 19 can range, for example, from about 10 cm to about 100 cm. In response to detecting two or more candidate geographical locations that fall within the sensing distance 19, the controller 32 extrapolates the line segment LS using the detected candidate geographical locations. The controller 32 detects crossing of the extrapolated line segment LS by the detection zone DZ and computes the line segment point LSP along the line segment LS. The line segment point LSP can be a mid-point or other point between the detected candidate geographical locations.

Detection Map K below illustrates the state of boundary closure after the controller 32 detects geographical location GLn and the line segment point LSP within the detection zone DZ of the vehicle 22.

| Detection Map K | | | |
|---|---|---|---|
| Recorded GLs | Flagged GLs | Line Segment GLs | Boundary GLs |
| 1 | 1 | | |
| 2 | 2 | 2 | |
| 3 | 3 | 3 | 3 |
| 4 | 4 | — | 4 |
| . . . | . . . | . . . | . . . |
| n − 1 | n − 1 | — | n − 1 |
| n | — | — | LSP |

As previously described, the line segment point LSP, or a point between LSP and GLn, can define the origin and terminus of the boundary 12.

Figure 13:
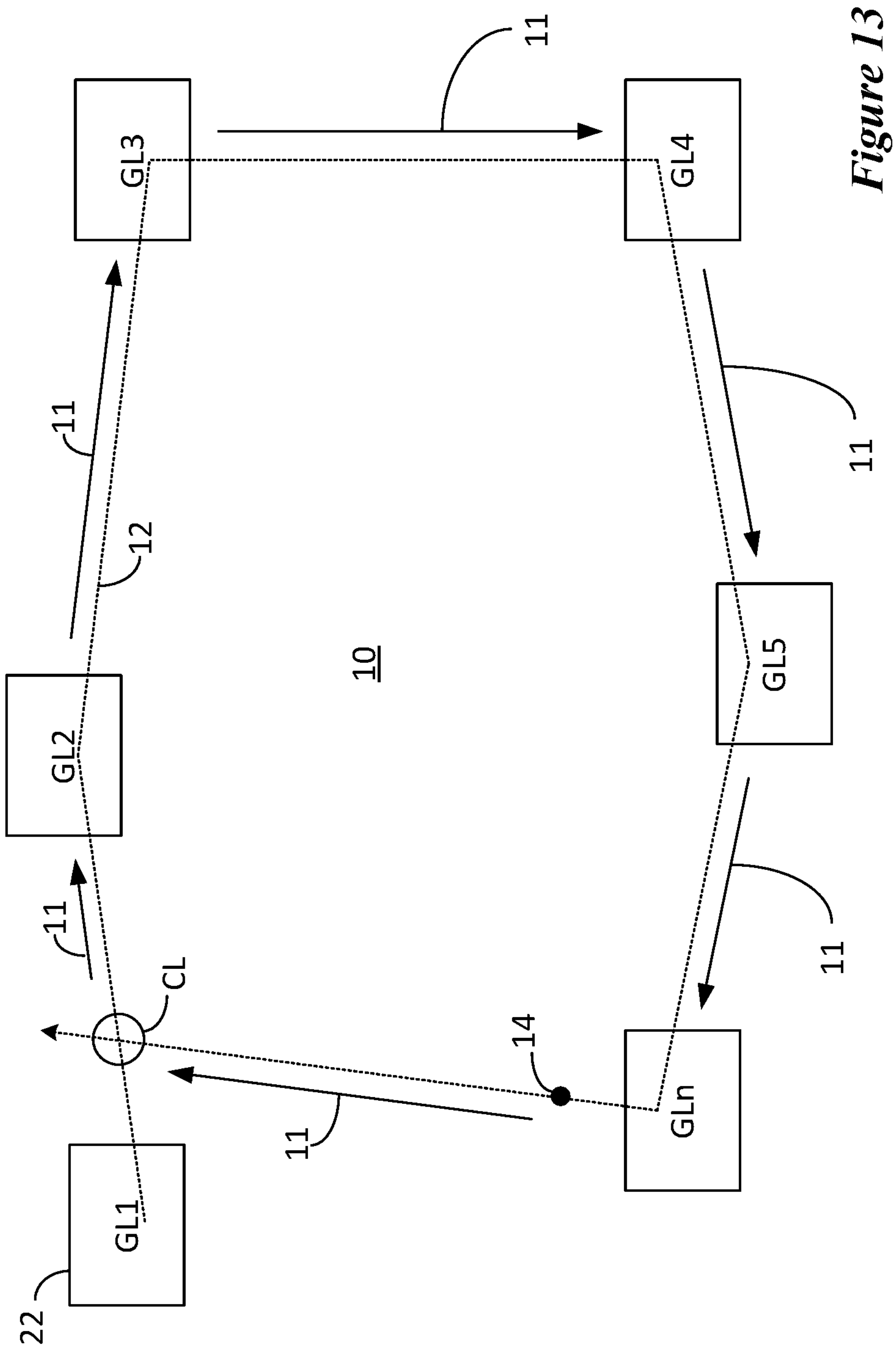
FIG. 13 illustrates a work region and a vehicle configured to implement a boundary closure methodology in accordance with any of the embodiments disclosed herein.
Figure 14:
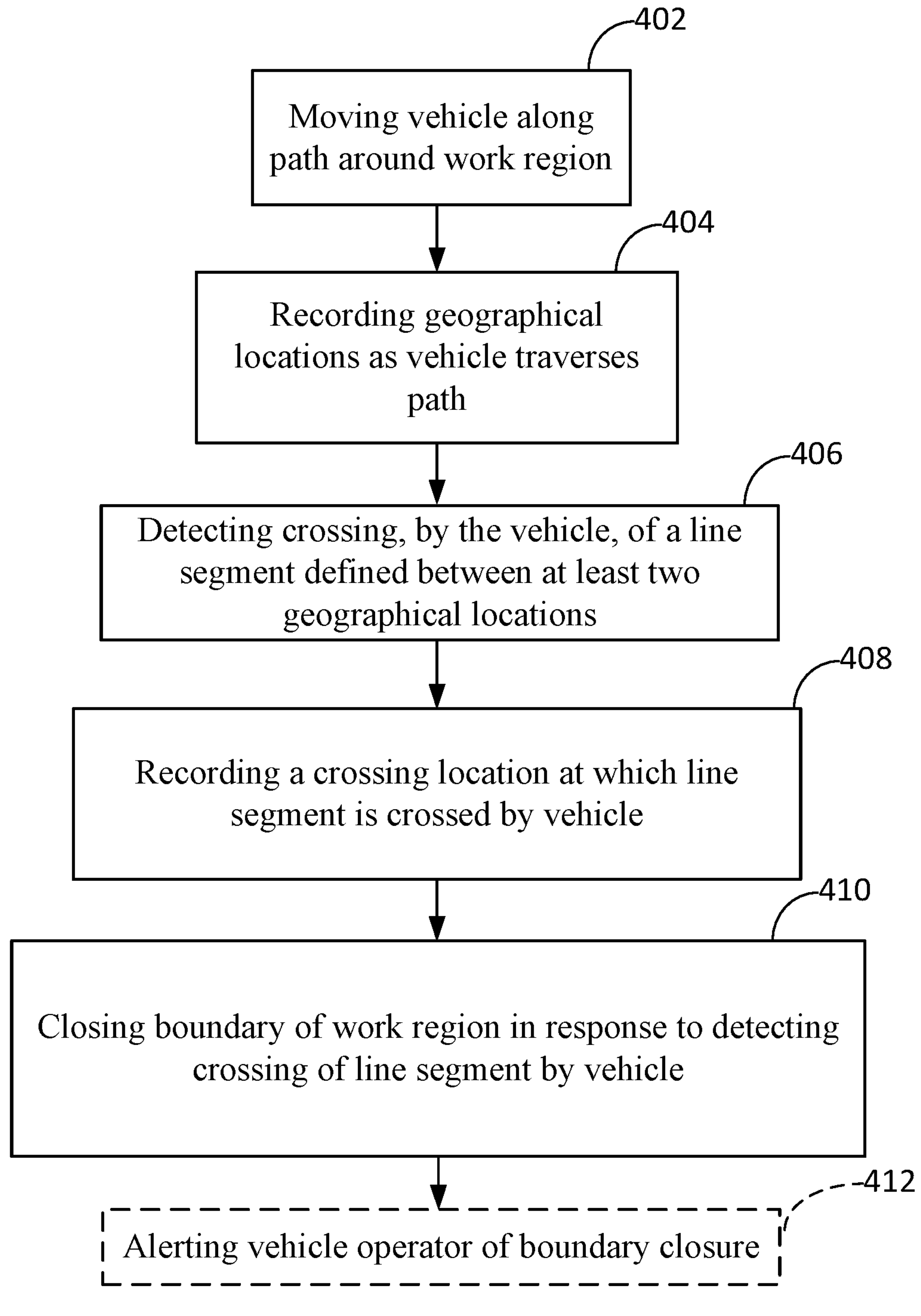
FIG. 14 illustrates a method by which a vehicle performs a boundary closure function in accordance with any of the embodiments disclosed herein.

FIGS. 13 and 14 illustrate a boundary closure methodology in accordance with any of the embodiments disclosed herein. FIG. 13 depicts a work region 10 and a vehicle 22 configured to operate around the work region 10. The vehicle 22 may be configured in a manner similar to the vehicle 22 shown in FIG. 1B. For purposes of illustration and clarity of explanation, FIG. 13 shows six geographical locations, GL1-GL6 (where n=6), that have been recorded by the controller 32 and stored in the memory 34 (see FIG. 1B) as the vehicle 22 traverses the path 11. It is understood that the limited number of geographical locations shown in FIG. 13 and other figures is for purposes of clarity of explanation.

The vehicle 22 is configured to implement a boundary closure function in accordance with any of the embodiments disclosed herein. FIG. 14 illustrates a method by which the vehicle 22 of FIG. 13 performs a boundary closure function according to various embodiments. The method illustrated in FIG. 14 involves moving at 402 the vehicle 22 along a path 11 (shown by arrows) around the work region 10. The method involves recording at 404 a geographical location at each of a multiplicity of vehicle positions (e.g., every 20 cm) as the vehicle 22 traverses the path 11. Each of geographical locations GL1-GL6 (where n=6) has been recorded by the time vehicle 22 reaches location 14.

The method of FIG. 14 also involves detecting at 406 (e.g., by the vehicle 22/controller 32) crossing of a line segment defined between at least two geographical locations (e.g., GL1 and GL2). The line segment can be a straight line segment or a curved line segment. The method also involves recording at 408 a crossing location CL at which the line segment is crossed by the vehicle 22. The method further involves closing at 410 the boundary 12 of the work region 10 in response to detecting crossing of the line segment by the vehicle 22. The method also optionally involves alerting at 412 the vehicle operator of the boundary closure, e.g., via the user interface.

As shown in FIG. 13, the boundary 12 can be defined by geographical locations recorded as the vehicle 22 traversed the path away from the crossing location CL and back to the crossing location CL. In other words, the crossing location CL can define an origin and a terminus of the boundary 12 of the work region 10. In this context, the boundary 12 can be defined by the origin and additional geographical locations recorded as the vehicle 22 traversed the path 11 away from the origin and to the terminus. In this illustrative example, the boundary 12 is defined by the path 11 that originates at CL, passes through GL2, GL3, GL4, GL5 and GL6 (n=6), and terminates at CL. In other words, the boundary 12 is defined by the closed path 11 that passes through GL2, GL3, GL4, GL5, GL6 (n=6), and CL.

In some cases, as previously described, the boundary 12 is established in the manner described herein may be undesirable. In such cases, the operator of the vehicle 22 can use the user interface 38 (onboard the vehicle or via a smartphone) to delete the boundary 12. A new boundary 12 can be created by the operator in a manner described herein. In some implementations, the boundary closure location (crossing location CL) can be deleted by the operator (e.g., rather than the entire boundary 12), and a new boundary closure location can be established in a manner described herein.

Figure 15:
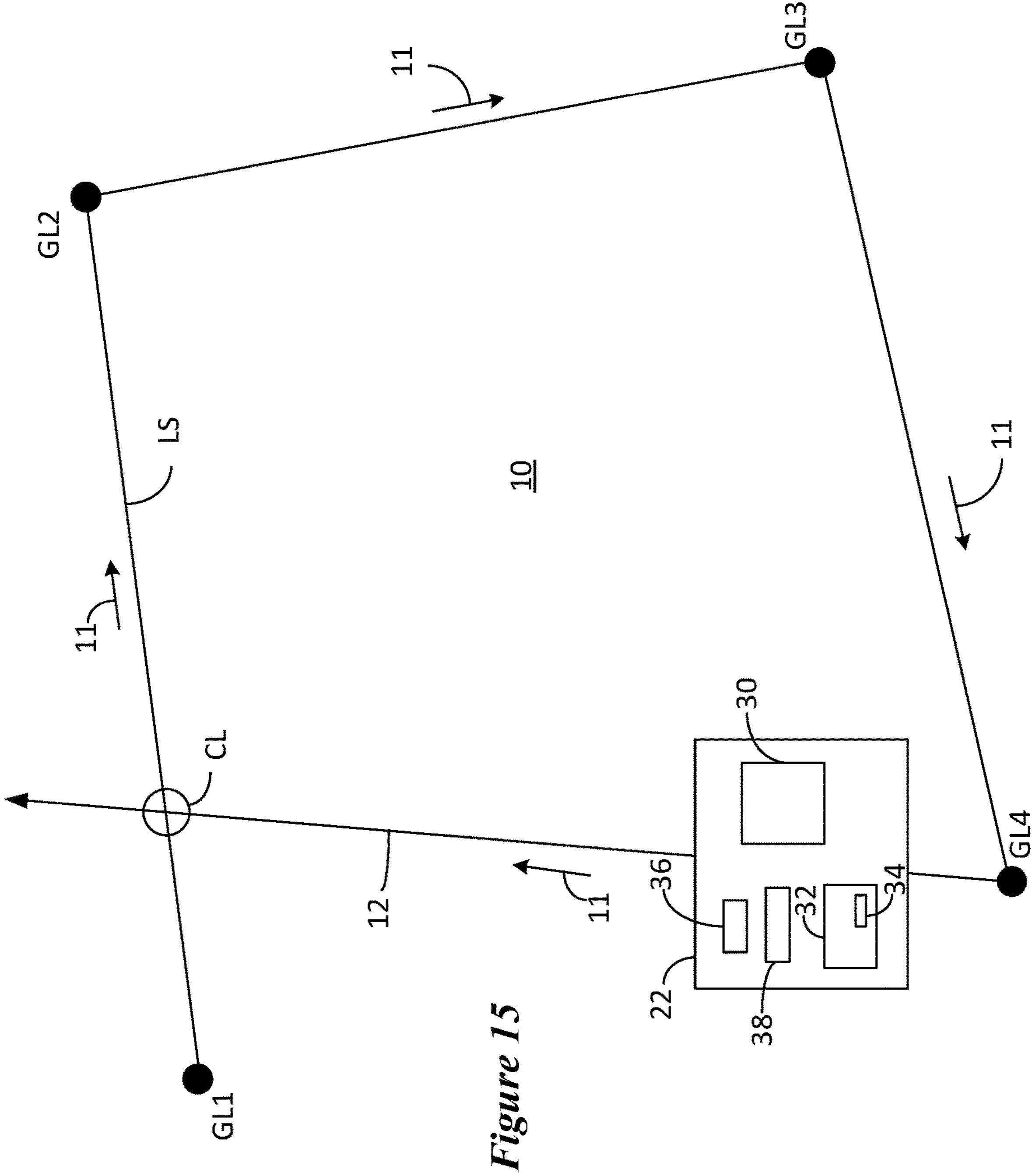
FIG. 15 illustrates a boundary closure methodology in accordance with any of the embodiments disclosed herein.

FIG. 15 illustrates a boundary closure methodology in accordance with any of the embodiments disclosed herein. It is understood that the limited number of geographical locations and spacing therebetween as shown in FIG. 15 is provided for clarity of explanation. In a typical operational implementation, there may be hundreds or thousands of geographical locations recorded by the controller 32 as the vehicle 22 moves along a path 11 around a work region 10.

It is assumed that the vehicle 22 is moved around the work region 10 and that the operator initiates the boundary closure function via the user interface 38. In response to initiating the boundary closure function, the controller 32, in cooperation with the positioning sensor 36, records geographical location GL1. The vehicle 22 is moved along the path 11 and additional geographical locations are recorded (e.g., GL2, GL3, GL4).

In some implementations, the controller 32 can maintain a geographical location map in the memory 34 as the vehicle 22 moves along the path 11. The geographical location map can indicate the geographical locations recorded, the geographical locations defining a line segment, and the geographical locations that define the boundary 12. Representative geographical location maps are provided below. Geographical Location Map L illustrates the state of boundary closure after the controller 32 records geographical location GL1.

| Geographical Location Map L | | |
|---|---|---|
| Recorded GLs | Line Segment GLs | Boundary GLs |
| 1 | — | — |
| — | — | — |
| — | — | — |
| — | — | — |
| — | — | — |

The vehicle 22 moves away from geographical location GL1 and, at some later point along the path 11, the controller records geographical location GL2. Geographical Location Map M illustrates the state of boundary closure after the controller 32 records geographical location GL2.

| Geographical Location Map M | | |
|---|---|---|
| Recorded GLs | Line Segment GLs | Boundary GLs |
| 1 | — | — |
| 2 | — | — |

-continued

| Geographical Location Map M | | |
|---|---|---|
| Recorded GLs | Line Segment GLs | Boundary GLs |
| — | — | — |
| — | — | — |
| — | — | — |

The vehicle 22 moves away from geographical location GL2 and, at some later point along the path 11, the controller records geographical location GL3. Geographical Location Map N illustrates the state of boundary closure after the controller 32 records geographical location GL3.

| Geographical Location Map N | | |
|---|---|---|
| Recorded GLs | Line Segment GLs | Boundary GLs |
| 1 | — | — |
| 2 | — | — |
| 3 | — | — |
| — | — | — |
| — | — | — |

The vehicle 22 moves away from geographical location GL3 and, at some later point along the path 11, the controller records geographical location GL4. Geographical Location Map O illustrates the state of boundary closure after the controller 32 records geographical location GL4.

| Geographical Location Map O | | |
|---|---|---|
| Recorded GLs | Line Segment GLs | Boundary GLs |
| 1 | — | — |
| 2 | — | — |
| 3 | — | — |
| 4 | — | — |
| — | — | — |

The vehicle 22 moves away from geographical location GL4 and towards a section of the path 11 located between geographical locations GL1 and GL2. The controller 32 extrapolates a line segment LS defined between geographical locations GL1 and GL2. In this illustrative example, the line segment LS is straight, it being understood that the line segment LS can be a curved line segment. In response to detecting the line segment LS, the controller 32 records a crossing location CL as the location at which the line segment LS is crossed by the vehicle 22. Geographical Location Map P illustrates the state of boundary closure after the controller 32 records the geographical location of the crossing location CL.

| Geographical Location Map P | | |
|---|---|---|
| Recorded GLs | Line Segment GLs | Boundary GLs |
| 1 | 1 | — |
| 2 | 2 | 2 |
| 3 | — | 3 |
| 4 | — | 4 |
| CL | — | CL |

The boundary 12 of the work region 10 is defined by the path 11 that originates at crossing location CL, passes through GL2, GL3, and GL4, and terminates at crossing location CL. In other words, the boundary 12 of the work region 10 is defined by the closed path 11 that includes crossing location CL, GL2, GL3, and GL4. According to some embodiments, after defining the boundary 12 of the work region 10, the controller is configured to autonomously work the work region 10 within the boundary 12 using a grounds care implement of the vehicle 22 (e.g., a grounds care vehicle). In the case of a survey vehicle 22, the boundary data collected by the survey vehicle 22 can be transferred to the controller/memory of a grounds care vehicle configured to autonomously work the work region 10 within the boundary 12 using a grounds care implement.

Figure 16A:
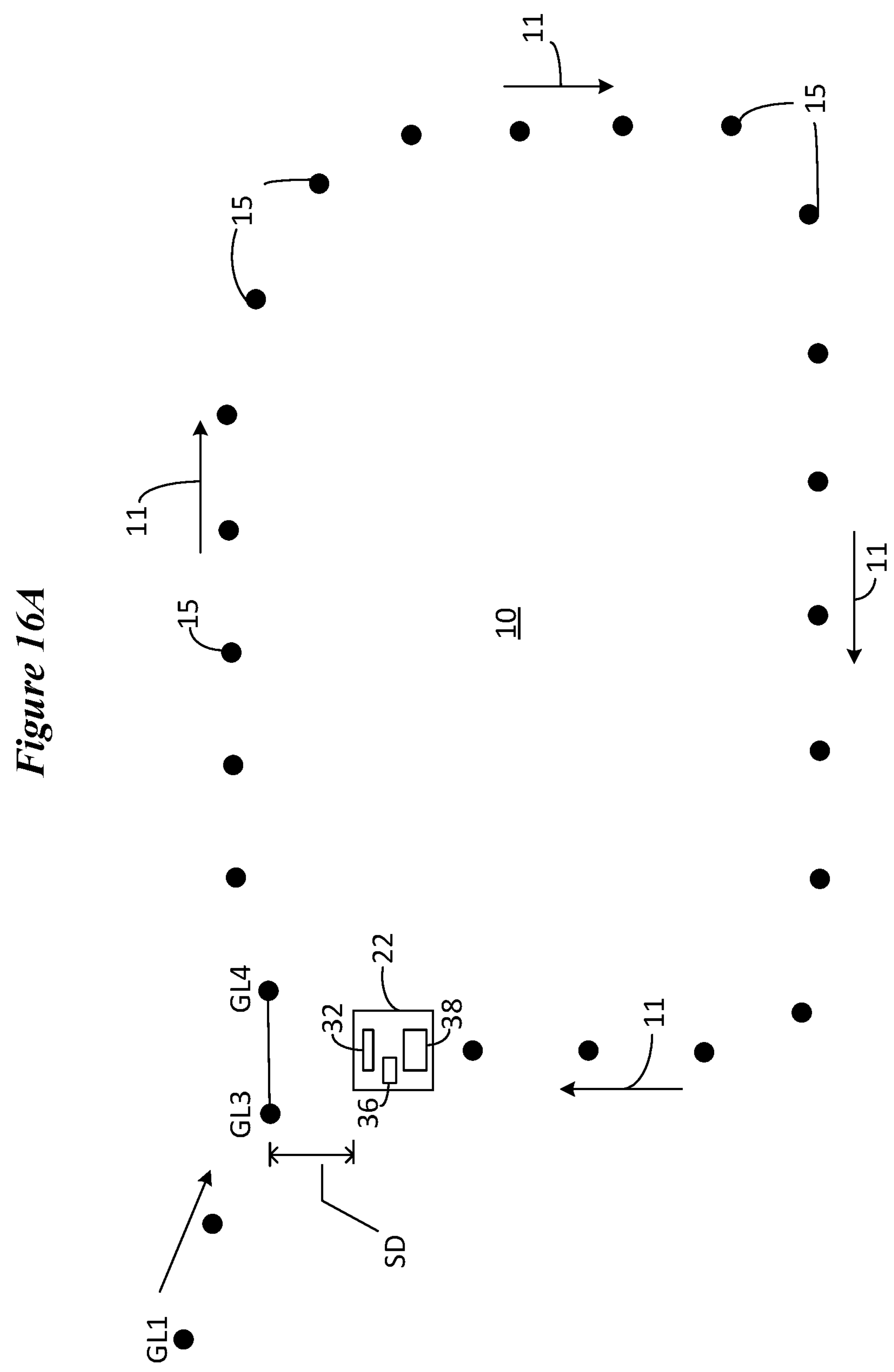
Figure 16B:
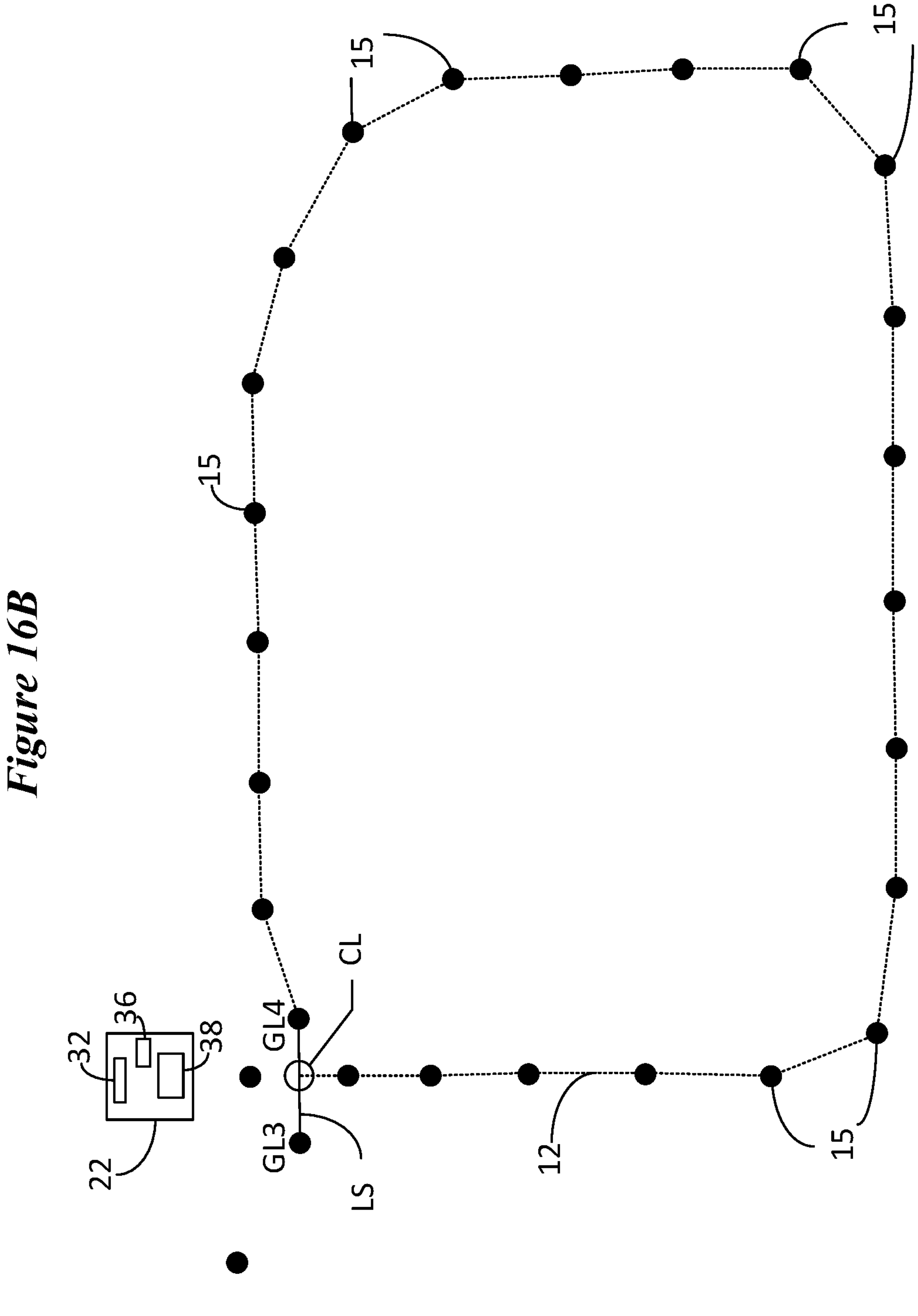

Turning now to FIGS. 16A and 16B, a representative boundary closure procedure is implemented by the vehicle 22 beginning with the recording of GL1 by the controller 32. As previously described, the boundary closure procedure can be initiated in response to an operator input to the user interface 38 (e.g., located onboard the vehicle or on a smartphone, tablet or other computer) communicatively coupled to the controller 32. The vehicle 22 is moved (e.g., manually or remotely controlled by the operator) along a path 11 around a work region 10. As the vehicle 22 traverses the path 11, the controller 32 records geographical locations 15. Although shown as being generally equidistant, the spacing between geographical locations 15 can be variable. For example, each of the geographical locations 15 can correspond to a sampling of the positioning sensor 36, with spacing between geographical locations 15 being dependent on the speed and direction of the vehicle 22 while sampling the positioning sensor 36.

In the illustration shown in FIG. 16A, the vehicle 22 is shown to have a heading directed towards a section of the path 11 comprising previously recorded geographical locations GL3 and GL4. As is shown in FIG. 16B, the vehicle 22 crosses a line segment LS defined between geographical locations GL3 and GL4. The controller 32 is configured to extrapolate the line segment LS using an extrapolation algorithm (e.g., regression, polynomial curve fitting) to define the line segment LS. Although FIG. 16A shows the line segment LS defined between two geographical locations, it is understood that more than two geographical locations (e.g., 3, 4, or 5 geographical locations) can be used to define the line segment LS.

The vehicle 22 crosses the line segment LS at a crossing location CL, shown in FIG. 16B. The controller 32 can compute the crossing location CL as the midpoint (or other point) between geographical locations GL3 and GL4. In response to the controller 32 computing the crossing location CL, the boundary 12 of the work region 10 is automatically (or manually) closed at the crossing location CL by the controller 32.

In this illustrative example, the boundary 12 is defined by the crossing location CL and additional geographical locations 15 recorded as the vehicle 22 traversed the path away from the crossing location CL and back to the crossing location CL. In other words, the crossing location CL defines the origin and the terminus of the boundary 12. In the illustrative example shown in FIG. 16B, the boundary closure procedure effectively trims a portion of the path 11 originating from GL1 and terminating at the crossing location CL from the boundary 12.

According to some embodiments, the controller 32 is configured to extrapolate the line segment LS using two or more geographical locations that are in proximity to the vehicle 22. For example, the controller 32 can be configured to detect two or more geographical locations that are proximate a current location of the vehicle 22. The controller 32 can compare the current location of the vehicle 22 with previously stored geographical locations near the vehicle 22 to determine candidate geographical locations for extrapolating the line segment LS.

In some embodiments, the controller 32 can detect previously stored geographical locations that are within a sensing distance SD or radius (e.g., see predetermined sensing distance/radius 19 in FIG. 12A) of the current location of the vehicle. The sensing distance SD can range, for example, from about 10 cm to about 100 cm. In response to detecting two or more candidate geographical locations that fall within the sensing distance SD, the controller 32 extrapolates the line segment LS using the detected candidate geographical locations. The controller 32 detects crossing of the extrapolated line segment LS by the vehicle 22 and computes the crossing location CL along the line segment LS.

In other embodiments, the controller 32 can be configured to determine a current location and direction of the vehicle 22. The controller 32 can be configured to detect two or more geographical locations that are proximate the current location of the vehicle 22 and are in a potential intersecting relationship with the vehicle 22 based on the current vehicle direction. The controller 32 can extrapolate the line segment LS using the detected geographical locations, and detect crossing of the extrapolated line segment by the vehicle 22. The controller 32 computes the crossing location CL along the line segment LS.

FIG. 17 illustrates one example of an autonomous grounds care vehicle in the form of a mower 100. In some embodiments, the mower 100 is configured to implement a boundary closure function in a manner previously described. In other embodiments, a survey vehicle can be configured to implement a boundary closure function, and the boundary data collected by the survey vehicle can be transferred to a controller/memory of the mower 100.

As shown in FIG. 17, the mower 100 includes a housing 102 (e.g., frame or chassis with a shroud) that carries and/or encloses various components of the mower as described below. The mower 100 may further include ground support members, such as wheels, rollers, or tracks. In the illustrated embodiment, the ground support members include one or more rear wheels 106 and one or more front wheels 108, that support the housing 102 upon a ground (grass) surface 103. As illustrated, the front wheels 108 are used to support a front end portion 134 of the mower housing 102 and the rear wheels 106 are used to support the rear end portion 136 of the mower housing.

One or both rear wheels 106 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the blade 110. While illustrated herein using only a single blade 110 and/or motor 112, mowers incorporating multiple blades, powered by single or multiple motors, are contemplated. Embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure.

The mower 100 may further include one or more sensors to provide location data. For instance, various embodiments may include a positioning sensor in the form of a Global Navigational Satellite System (GNSS, e.g., global positioning system or "GPS") receiver 116 (or other positioning sensor that may provide similar data). The GPS receiver 116 may be adapted to estimate a position of the mower 100 within the work region and provide such information to an electronic controller 120 (described below). In other embodiments, one or more of the wheels 106, 108 may include encoders 118 that provide wheel rotation/speed information that may be used to estimate mower position (e.g., based upon an initial start position) within a given work region.

The mower 100 may include one or more front obstacle detection sensors 130 and one or more rear obstacle detection sensors 132, as well as other sensors, such as side obstacle detection sensors (not shown). The obstacle detection sensors 130, 132 may be used to detect an obstacle in the path of the mower 100 when travelling in a forward or reverse direction, respectively. The mower 100 may be capable of mowing while moving in either direction. As illustrated, the sensors 130, 132 may be located at the front end portion 134 and/or rear end portion 136 of the mower 100, respectively. The sensors 130, 132 may use contact sensing (e.g., a contact bumper), non-contact sensing (e.g., using infrared, radio detection and ranging (radar), light detection and ranging (lidar), etc.), or both types of sensing.

The mower 100 may include one or more vision-based sensors to provide localization data, such as position, orientation, and/or velocity. The vision-based sensors may include one or more cameras 133 that capture or record images for use with a vision system. The cameras 133 may be described as part of the vision system of the mower 100. Types of images include, for example, training images and/or operational images.

The one or more cameras may be capable of detecting visible light, non-visible light, or both. In some embodiments, the mower 100 includes four cameras 133. One camera 133 may be positioned in each of one or more directions including a forward direction, a reverse direction, a first (e.g., left) side direction, and a second (e.g., right) side direction (e.g., Cardinal directions relative to the mower 100). One or more camera directions may be positioned orthogonal to one or more other camera directions or positioned opposite to at least one other camera direction. The cameras 133 may also be offset from any of these directions (e.g., at a 45 degree or another non-right angle).

In some embodiments, the mower 100 may be guided along a path, for example, in a manual manner using handle assembly 90. In particular, manual direction of the mower 100 may be used during a training mode to learn a work region 10 or a boundary 12 associated with the work region 10 as described above. The handle assembly 90 may extend outward and upward from a rear end portion 136 of the mower 100. Of course, larger mowers may instead be driven (or remotely controlled) by an operator rather than guided by a handle assembly.

The camera 133 positioned in a forward direction may have a pose that represents the pose of the autonomous machine. The pose may be a six-degrees of freedom pose, which may include all position and orientation parameters for a three-dimensional space. In some embodiments, the position and orientation of the cameras may be defined relative to a geometric center of the mower 100 or relative to one of the edges of the mower 100.

Sensors of the mower 100 may also be described as either vision-based sensors and non-vision-based sensors. Vision-based sensors may include cameras 133 that are capable of recording images. The images may be processed and used to build a 3-dimensional point cloud (3DPC) or used for optical odometry (e.g., optical encoding). Non-vision-based sensors may include any sensors that are not cameras 133. For example, a wheel encoder that uses optical (e.g., photo-diode), magnetic, or capacitive sensing to detect wheel revolutions may be described as a non-vision-based sensor that does not utilize a camera.

Optical encoding may be used by taking a series or sequence of images and comparing features in the images to determine or estimate a distance traveled between the images. Optical encoding may be less susceptible to wheel slippage than a wheel encoder for determining distance or speed.

The mower 100 may also include the controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GPS receiver 116 and/or encoders 118 and generate speed and steering angle commands to the one or more wheel motors 104 to cause the drive wheels 106 to rotate (at the same or different speeds and in the same or different directions). In other words, the controller 120 may control the steering angle and speed of the mower 100, as well as the speed and operation of the cutting blade.

In general, GPS data generated based on data from the GPS receiver 116 may be used in various ways to facilitate determining a pose of the mower 100. In some embodiments, GPS data may be used as one of the non-vision-based sensors to help determine non-vision-based pose data. The non-vision-based pose data may be updated or corrected using vision-based pose data. GPS data may also be used to facilitate updating or correcting an estimated pose, which may be based on non-vision-based pose data and/or vision-based pose data. In some embodiments, the GPS data may be augmented using a GPS-specific correction data, such as real-time kinematics (RTK) data. GPS-RTK data may provide a more accurate or precise location that corrects for anomalies in GPS timing compared to nominal GPS data. Reference herein may be made to various parameters, data, or data structures, which may be handled in a controller 120, for example, by being processed by a processor 122 or stored in or retrieved from a memory 124.

The controller 120 may use the processor 122 and memory 124 in various different systems. In particular, one or more processors 122 and memory 124 may be included in each different system. In some embodiments, the controller 120 may at least partially define a vision system, which may include a processor 122 and memory 124. The controller 120 may also at least partially define a navigation system, which may include a processor 122 and memory 124 separate from the processor 122 and memory 124 of the vision system.

Each system may also be described as having its own controller 120. For example, the vision system may be described as including one controller 120 and the navigation system may be described as having another controller 120. As such, the mower 100 may be described as having multiple controllers 120. In general, as used herein, the term "controller" may be used to describe components of a "system" that provide commands to control various other components of the system. In addition, the mower 100 may be in operative communication with a separate portable electronic device 119, such as a smartphone or remote computer. For example, the portable electronic device 119 can be used by an operator to initiate a boundary closure function as previously described.

In view of the above, it will be readily apparent that the functionality of the controller 120 (and controller 32 shown in other figures) may be implemented in any manner known to one skilled in the art. The memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed in the cloud or other distributed computing systems operably connected to the processor 122.

In FIG. 17, schematic connections are generally shown between the controller 120 and the battery 114, the one or more wheel motors 104, the blade motor 112, an optional ground boundary wire sensor 115, a wireless radio 117, and the GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, 133 are not shown, these sensors and other components of the mower 100 may be connected in a similar manner. The wireless radio 117 may communicate over a cellular or other wide area network (e.g., even over the internet), a local area network (e.g., IEEE 802.11 "Wi-Fi" radio), or a peer-to-peer (P2P) (e.g., BLUETOOTH) network with the mobile device 119 (e.g., mobile computing device, mobile computer, handheld computing device, smartphone, cellular phone, tablet, desktop, or wearable computer, smartwatch, etc.). In turn, the mobile device 119 may communicate with other devices over similar networks and, for example, may be used to connect the mower 100 to the internet.

Additional details of exemplary mower 100 and aspects of autonomous operation of mower 100 and other forms of grounds care vehicle 22 are disclosed in U.S. Provisional Patent Application No. 62/818,893 filed on Mar. 15, 2019.

Embodiments of the disclosure are defined in the claims. However, below there is provided a non-exhaustive listing of non-limiting examples. Any one or more of the features of these examples may be combined with any one or more features of another example, embodiment, or aspect described herein.

Example 1. A method of defining a boundary of a work region, comprising: moving a vehicle along a path around a work region, wherein a detection zone having a predetermined size is defined for the vehicle; recording a geographical location at each of a plurality of vehicle positions as the vehicle traverses the path; sensing exiting of recorded geographical locations from the detection zone of the vehicle in response to the detection zone passing beyond the recorded geographical locations; flagging recorded geographical locations that exit the detection zone as being eligible for closing a boundary of the work region; sensing return of the vehicle to an eligible geographical location in response to the eligible geographical location falling within the detection zone; and closing the boundary of the work region in response to sensing return of the vehicle to the eligible geographical location.

Example 2. The method according to Example 1, wherein a geometric center of the detection zone is located at approximately a center of the vehicle.

Example 3. The method according to any one of Examples 1-2, wherein the detection zone is biased forward of a mid-point of the vehicle towards a front end of the vehicle.

Example 4. The method according to any one of Examples 1-3, wherein the detection zone is located proximate a cutting deck attached to the vehicle.

Example 5. The method according to any one of Examples 1-4, wherein: the vehicle comprises an implement towed by the vehicle; and the detection zone is positioned between a mid-point of the vehicle and a mid-point of the implement.

Example 6. The method according to any one of Examples 1-5, wherein closing the boundary comprises automatically closing the boundary in response to sensing return of the vehicle to the eligible geographical location.

Example 7. The method according to any one of Examples 1-6, wherein closing the boundary comprises issuing a notification via a user interface in response to sensing return of the vehicle to the eligible geographical location, the notification requesting user action to manually close the boundary.

Example 8. The method according to any one of Examples 1-7, further comprising: repeating the method to define a boundary of an exclusion zone within the boundary of the work region; automatically determining that the exclusion zone falls within the boundary of the work region; and autonomously operating the vehicle within the boundary of the work region while avoiding the exclusion zone.

Example 9. The method according to any one of Examples 1-8, further comprising defining the boundary by the eligible geographical location and additional geographical locations recorded as the vehicle traversed the path away from the eligible geographical location and back to the eligible geographical location.

Example 10. A system for defining a boundary of a work region, comprising: a vehicle configured to traverse a path around a work region; a positioning sensor supported by the vehicle; and a controller supported by the vehicle and operably coupled to the positioning sensor, the controller configured to: record a geographical location at each of a plurality of vehicle positions as the vehicle traverses the path, wherein a detection zone having a predetermined size is defined for the vehicle; sense exiting of recorded geographical locations from the detection zone of the vehicle in response to the detection zone passing beyond the recorded geographical locations; flag the recorded geographical locations that exit the detection zone as being eligible for boundary closure; sense return of the vehicle to an eligible geographical location in response to the eligible geographical location falling within the detection zone; and close a boundary of the work region in response to sensing return of the vehicle to the eligible geographical location.

Example 11. The system according to Example 10, wherein the vehicle comprises either: a grounds care vehicle comprising a grounds care implement and operable in an autonomous mode; or a survey vehicle.

Example 12. The system according to any one of Examples 10-11, comprising a user interface operably coupled to the controller, the user interface configured to receive a user command to initiate defining of the boundary.

Example 13. The system according to any one of Examples 10-12, comprising a user interface operably coupled to the controller, the user interface configured to one or both of visually and audibly communicate status of defining the boundary.

Example 14. The system according to any one of Examples 10-13, wherein the user interface is a component of the vehicle, or is a component of a separate electronic device communicatively coupled to the controller.

Example 15. The system according to any one of Examples 10-14, wherein a geometric center of the detection zone is located at approximately a center of the vehicle.

Example 16. The system according to any one Examples 10-15, wherein: the vehicle comprises a front end and a rear end; and the detection zone is biased forward of a mid-point of the vehicle towards the front end.

Example 17. The system according to any one of Examples 10-16, wherein the detection zone is located proximate a cutting deck of the vehicle.

Example 18. The system according to any one of Examples 10-17, wherein: the vehicle comprises a grounds care implement towed by the vehicle; and the detection zone is positioned between a mid-point of the vehicle and a mid-point of the implement.

Example 19. The system according to any one of Examples 10-18, wherein the predetermined size of the detection zone is: smaller than a size of the vehicle; about the size of the vehicle; or larger than the size of the vehicle.

Example 20. The system according to any one of Examples 10-19, wherein the predetermined size of the detection zone corresponds to a width of the vehicle or a radius of the vehicle.

Example 21. The system according to any one of Examples 10-20, wherein the controller is configured to autonomously work the work region within the boundary using a grounds care implement.

Example 22. The system according to any one of Examples 11, 18, and 21, wherein the grounds care implement comprises one of a cutting deck, an aerator, a snow clearing implement, a fertilizing implement, and a weed management implement.

Example 23. A method of defining a boundary of a work region, comprising: moving a vehicle along a path within a work region, wherein a detection zone having a predetermined size is defined for the vehicle; recording a geographical location at each of a plurality of vehicle positions as the vehicle traverses the path; sensing exiting of recorded geographical locations from the detection zone of the vehicle in response to the detection zone passing beyond the recorded geographical locations; flagging recorded geographical locations that exit the detection zone as being eligible for closing a boundary of the work region; detecting, within the detection zone, a particular geographical location and a point on a line segment defined between two or more eligible geographical locations; and closing the boundary of the work region in response to detecting the particular geographical location and the line segment point within the detection zone.

Example 24. The method according to Example 23, wherein: the line segment point or a location between the line segment point and the particular geographical location defines an origin and a terminus of the boundary of the work region; and the boundary is defined by the origin and additional geographical locations recorded as the vehicle traversed the path away from the origin and to the terminus.

Example 25. The method according to any one of Examples 23-24, further comprising extrapolating the line segment using two of the two or more of the eligible geographical locations.

Example 26. The method according to any one of Examples 23-25, wherein: detecting the line segment point comprises detecting the two or more eligible geographical locations within a predetermined distance or radius of the vehicle, the predetermined distance or radius being equal to or greater than the predetermined size of the detection zone; and extrapolating the line segment using the two or more eligible geographical locations detected within the predetermined distance or radius.

Example 27. A method of defining a boundary of a work region, comprising: moving a vehicle along a path around a work region; recording a geographical location at each of a plurality of vehicle positions as the vehicle traverses the path; detecting crossing, by the vehicle, of a line segment defined between at least two geographical locations; recording a crossing location at which the line segment is crossed by the vehicle, the crossing location defining an origin and a terminus of the boundary of the work region; and closing the boundary of the work region in response to detecting crossing of the line segment by the vehicle, the boundary defined by the origin and additional geographical locations recorded as the vehicle traversed the path away from the origin and to the terminus.

Example 28. The method according to Example 27, comprising extrapolating the line segment using two or more of the geographical locations.

Example 29. The method according to Example 27, comprising extrapolating the line segment using two or more of the geographical locations that are in proximity to the vehicle.

Example 30. The method according to Example 27, comprising: detecting two or more geographical locations that are proximate a current location of the vehicle; extrapolating the line segment using the two or more detected geographical locations; and detecting crossing of the extrapolated line segment by the vehicle.

Example 31. The method according to Example 27, comprising: determining a current location and direction of the vehicle; detecting two or more geographical locations that are proximate the current location of the vehicle and in a potential intersecting relationship with the vehicle based on the current direction of the vehicle; extrapolating the line segment using the detected two or more geographical locations; and detecting crossing of the extrapolated line segment by the vehicle.

Example 32. The method according to any one of Examples 27-31, wherein detecting the crossing of the line segment comprises detecting the at least two geographical locations within a predetermined distance or radius of a current location of the vehicle.

Example 33. A method of defining a boundary of a work region, comprising: moving a vehicle along a path around a work region; recording a geographical location at each of a plurality of vehicle positions as the vehicle traverses the path; detecting, with the vehicle, a point on a line segment defined between at least two of the geographical locations; and closing the boundary in response to detecting crossing of the line segment by the vehicle or detecting, within a detection zone of the vehicle, a particular geographical location in proximity to the line segment point, the boundary comprising an origin, a terminus defined by the line segment point or the particular geographical location, and additional geographical locations recorded as the vehicle traversed the path away from the origin and to the terminus.

Although reference is made herein to the accompanying drawing that forms part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

All headings provided herein are for the convenience of the reader and should not be used to limit the meaning of any text that follows the heading, unless so specified. Moreover, the term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

The terms "coupled" or "connected" refer to elements being attached to each other either directly (in direct contact with each other) or indirectly (having one or more intervening elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. Moreover, the phrases "at least one of," "comprises at least one of," and "one or more of" followed by a list refers to any one of the items in the list and any combination of two or more items in the list.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method of defining a boundary of a work region, comprising:

moving a vehicle along a path around a work region, wherein the vehicle is associated with a detection zone that is defined by a predetermined size and that is positioned relative to the vehicle;

recording a geographical location at each of a plurality of vehicle positions as the vehicle traverses the path;

sensing exiting of recorded geographical locations from the detection zone of the vehicle in response to the detection zone passing beyond the recorded geographical locations;

flagging recorded geographical locations that exit the detection zone as being candidate geographical locations for closing a boundary of the work region;

sensing return of the vehicle to a candidate geographical location in response to the candidate geographical location falling within the detection zone; and closing the boundary of the work region in response to sensing return of the vehicle to the candidate geographical location.

2. The method according to claim 1, wherein a geometric center of the detection zone is located at approximately a center of the vehicle.

3. The method according to claim 1, wherein the detection zone is biased forward of a mid-point of the vehicle towards a front end of the vehicle.

4. The method according to claim 1, wherein the detection zone is located proximate a cutting deck attached to the vehicle.

5. The method according to claim 1, wherein:

the vehicle comprises an implement towed by the vehicle; and the detection zone is positioned between a mid-point of the vehicle and a mid-point of the implement.

6. The method according to claim 1, wherein closing the boundary comprises automatically closing the boundary in response to sensing return of the vehicle to the eligible geographical location.

7. The method according to claim 1, wherein closing the boundary comprises issuing a notification via a user interface in response to sensing return of the vehicle to the eligible geographical location, the notification requesting user action to manually close the boundary.

8. The method according to claim 1, further comprising:

repeating the method to define a boundary of an exclusion zone within the boundary of the work region;

automatically determining that the exclusion zone falls within the boundary of the work region; and autonomously operating the vehicle within the boundary of the work region while avoiding the exclusion zone.

9. The method according to claim 1, further comprising defining the boundary by the eligible geographical location and additional geographical locations recorded as the vehicle traversed the path away from the eligible geographical location and back to the eligible geographical location.

10. A system for defining a boundary of a work region, comprising:

a vehicle configured to traverse a path around a work region;

a positioning sensor supported by the vehicle; and a controller supported by the vehicle and operably coupled to the positioning sensor, the controller configured to:

record a geographical location at each of a plurality of vehicle positions as the vehicle traverses the path, wherein the vehicle is associated with a detection zone that is defined by a predetermined size and that is positioned relative to the vehicle;

sense exiting of recorded geographical locations from the detection zone of the vehicle in response to the detection zone passing beyond the recorded geographical locations;

flag the recorded geographical locations that exit the detection zone as being candidate geographical locations for boundary closure;

sense return of the vehicle to a candidate geographical location in response to the candidate geographical location falling within the detection zone; and close a boundary of the work region in response to sensing return of the vehicle to the candidate geographical location.

11. The system according to claim 10, wherein the vehicle comprises either: a grounds care vehicle comprising a grounds care implement and operable in an autonomous mode; or a survey vehicle.

12. The system according to claim 10, comprising a user interface operably coupled to the controller, the user interface configured to receive a user command to initiate defining of the boundary.

13. The system according to claim 10, comprising a user interface operably coupled to the controller, the user interface configured to one or both of visually and audibly communicate status of defining the boundary.

14. The system according to claim 10, comprising a user interface operably coupled to the controller, wherein the user interface is a component of the vehicle, or is a component of a separate electronic device communicatively coupled to the controller.

15. The system according to claim 10, wherein a geometric center of the detection zone is located at approximately a center of the vehicle.

16. The system according to claim 10, wherein:

the vehicle comprises a front end and a rear end; and the detection zone is biased forward of a mid-point of the vehicle towards the front end.

17. The system according to claim 10, wherein the detection zone is located proximate a cutting deck of the vehicle.

18. The system according to claim 10, wherein:

the vehicle comprises a grounds care implement towed by the vehicle; and the detection zone is positioned between a mid-point of the vehicle and a mid-point of the implement.

19. The system according to claim 10, wherein the predetermined size of the detection zone is larger than the size of the vehicle.

20. The system according to claim 10, wherein the predetermined size of the detection zone corresponds to a width of the vehicle or a radius of the vehicle.

21. The system according to claim 10, wherein the controller is configured to autonomously work the work region within the boundary using a grounds care implement.

22. The system according to claim 21, wherein the grounds care implement comprises one of a cutting deck, an aerator, a snow clearing implement, a fertilizing implement, and a weed management implement.

23. The method of claim 1, wherein the size of the detection zone is different than a size of a sensing zone of a non-contact obstacle detection sensor of the vehicle.

24. The system of claim 10, further comprising a non-contact obstacle detection sensor, wherein the size of the detection zone is different than a sensing zone of the non-contact obstacle detection sensor of the vehicle.

* * * * *